United States Patent
Kiyota et al.

(10) Patent No.: US 10,109,043 B2
(45) Date of Patent: *Oct. 23, 2018

(54) IMAGE GENERATION DEVICE AND OPERATION SUPPORT SYSTEM

(71) Applicant: Sumitomo Heavy Industries, Ltd., Tokyo (JP)

(72) Inventors: Yoshihisa Kiyota, Kanagawa (JP); Tomoko Ichikawa, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 85 days.

This patent is subject to a terminal disclaimer.

(21) Appl. No.: 15/214,360

(22) Filed: Jul. 19, 2016

(65) Prior Publication Data

US 2016/0328833 A1    Nov. 10, 2016

Related U.S. Application Data

(63) Continuation of application No. PCT/JP2014/079473, filed on Nov. 6, 2014.

(30) Foreign Application Priority Data

Feb. 12, 2014 (JP) .................... 2014-024471

(51) Int. Cl.
  *G09G 5/00* (2006.01)
  *G06T 5/50* (2006.01)
  (Continued)

(52) U.S. Cl.
  CPC ............... *G06T 5/50* (2013.01); *E02F 9/261* (2013.01); *G06T 3/0062* (2013.01);
  (Continued)

(58) Field of Classification Search
  None
  See application file for complete search history.

(56) References Cited

U.S. PATENT DOCUMENTS 5,067,019 A * 11/1991 Juday .................... G06T 3/0018
                                          348/580
9,432,634 B2 * 8/2016 Kiyota .................. G06T 3/4038
  (Continued)

FOREIGN PATENT DOCUMENTS

EP    1 505 821 A2    2/2005
EP    1 892 150 A1    2/2008
  (Continued)

OTHER PUBLICATIONS

Extended Search Report issued in European Patent Application No. 14882404.8, dated Aug. 16, 2017.

*Primary Examiner* — Anh-Tuan V Nguyen
(74) *Attorney, Agent, or Firm* — Michael Best & Friedrich LLP

(57) ABSTRACT

An image generation device generates an output image based on input images captured by three cameras. An input image portion corresponding to an overlap region of imaging ranges of the cameras forms a lattice pattern in the output image. The lattice pattern uses, as a unit pattern, lattice points divided by circles drawn by waves around two cameras. Pixel values of the unit pattern are obtained by weight-averaging pixel values of first and second input images. A weighted average value of pixel values of the first input image is equal to or larger than a weighted average value of pixel values of the second input image in one of two unit patterns through which an abdominal line and a nodal line pass, and is equal to or smaller than the weighted average value of the pixel values of the second input image in the other one thereof.

13 Claims, 34 Drawing Sheets

(51) Int. Cl.
*E02F 9/26* (2006.01)
*H04N 5/232* (2006.01)
*H04N 7/18* (2006.01)
*G06T 3/00* (2006.01)
*E02F 3/32* (2006.01)

(52) U.S. Cl.
CPC ......... *H04N 5/23293* (2013.01); *H04N 7/181* (2013.01); *E02F 3/32* (2013.01); *E02F 9/262* (2013.01); *G06T 2207/20221* (2013.01); *G06T 2207/30232* (2013.01); *G06T 2207/30252* (2013.01)

(56) References Cited

U.S. PATENT DOCUMENTS

| | | | | |
|---|---|---|---|---|
| 2004/0047516 | A1* | 3/2004 | Tseng | G06T 5/009 382/274 |
| 2009/0015679 | A1* | 1/2009 | Hayakawa | G06T 13/20 348/207.1 |
| 2009/0169075 | A1* | 7/2009 | Ishida | G06K 9/3233 382/128 |
| 2010/0271186 | A1 | 10/2010 | Tanaka et al. | |
| 2013/0155241 | A1* | 6/2013 | Tanuki | B60R 1/00 348/148 |
| 2013/0222594 | A1 | 8/2013 | Kiyota | |
| 2015/0070734 | A1* | 3/2015 | Hagiwara | H04N 1/3878 358/447 |
| 2015/0249821 | A1* | 9/2015 | Tanizumi | B60R 1/00 348/46 |
| 2016/0044252 | A1* | 2/2016 | Molina | H04N 5/2258 348/208.6 |

FOREIGN PATENT DOCUMENTS

| | | |
|---|---|---|
| EP | 2 642 754 A1 | 9/2013 |
| JP | 2011-256295 A | 12/2011 |
| JP | 2012-109741 A | 6/2012 |
| JP | 2013-145470 A | 7/2013 |

* cited by examiner

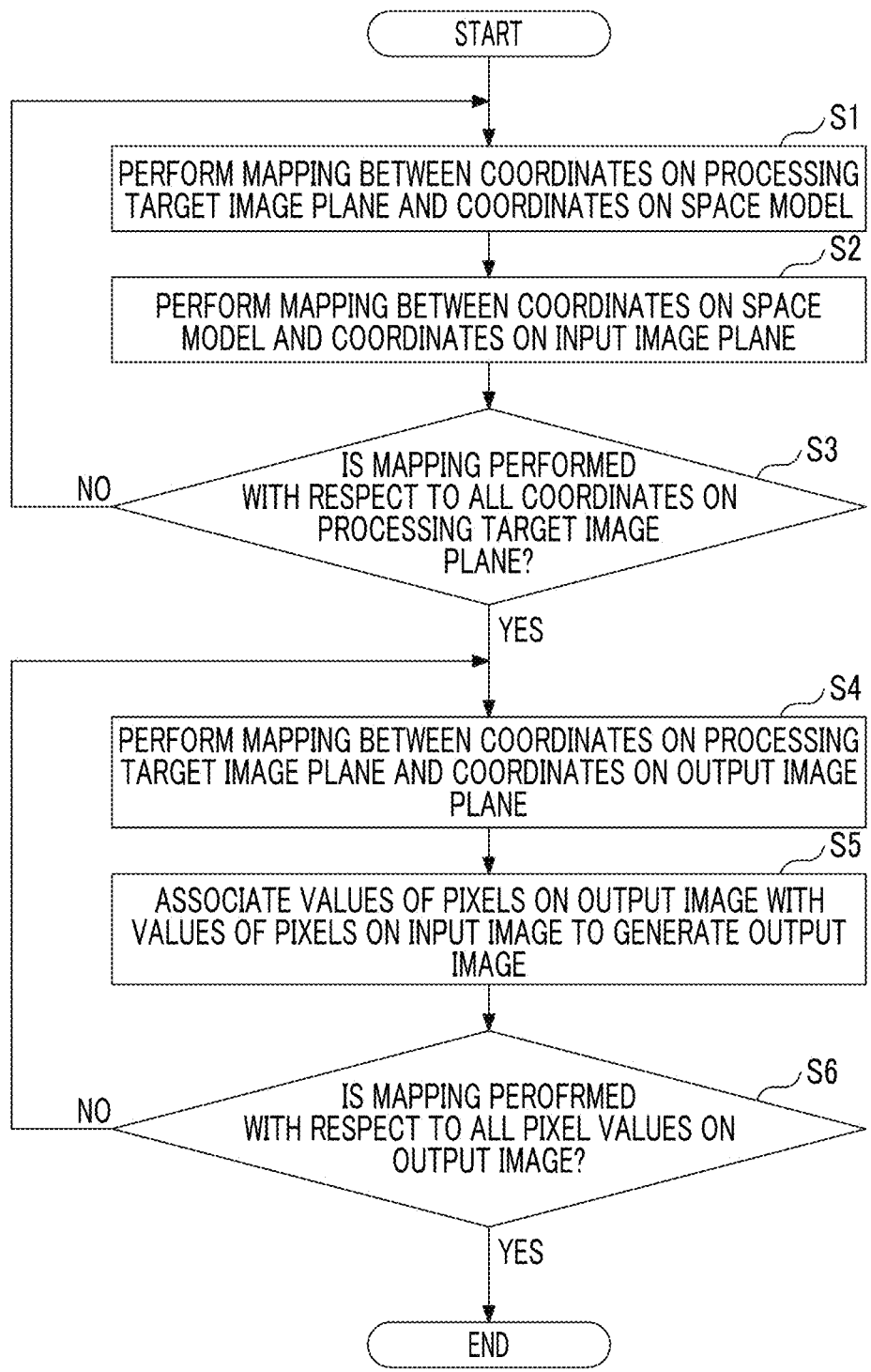

FIG. 13

| INTEGER COORDINATE POINT FOR SPECIFYING FIRST PIXEL | INTEGER COORDINATE POINT FOR SPECIFYING SECOND PIXEL | WEIGHT OF FIRST PIXEL VALUE: α |
|---|---|---|
| A | D | 255−dx |
| A | B | 255−dy |
| B | C | 255−dx |
| D | C | 255−dy |
| A | C | 255−(dx+dy)/2 |
| B | D | 255−(255−dy+dx)/2 |

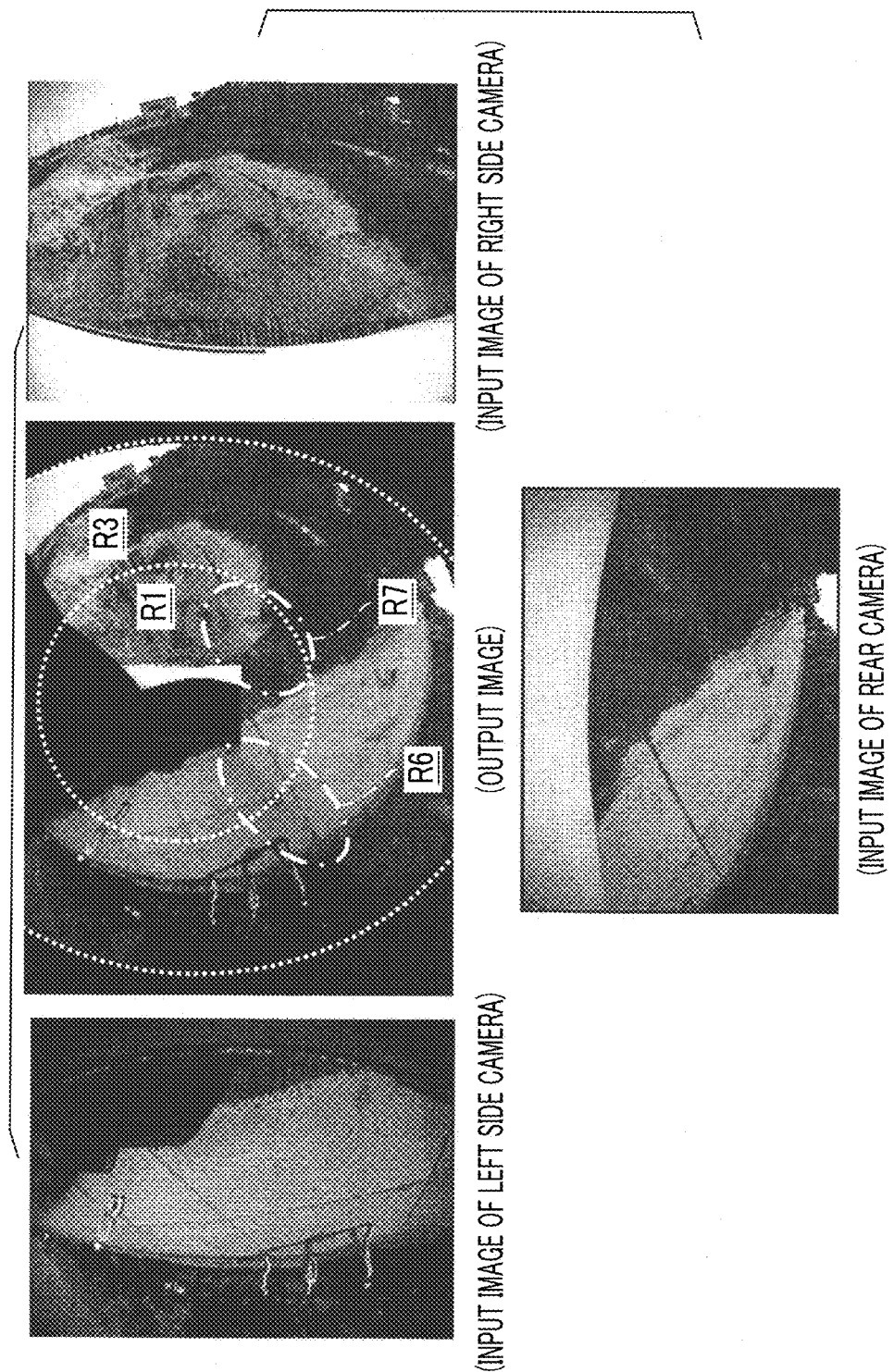

INPUT IMAGE OF REAR CAMERA

INPUT IMAGE OF REAR CAMERA

IMAGE GENERATION DEVICE AND OPERATION SUPPORT SYSTEM

RELATED APPLICATIONS

This is a continuation of PCT/JP2014/079473 filed on Nov. 6, 2014, now pending. Priority is claimed on Japanese Patent Application No. 2014-024471, filed on Feb. 12, 2014, the content of which is incorporated herein by reference.

BACKGROUND

Technical Field

Certain embodiments of the present invention relate to an image generation device that generates an output image based on plural input images captured by plural cameras attached to an operation target body and an operation support system using the image generation device.

Description of Related Art

In the related art, an image generation device that prevents loss of an object in an output image portion corresponding to an overlap portion where respective imaging ranges of plural camera overlap each other, in an output image generated based on plural input images captured by plural cameras, is known.

Such an image generation device generates an output image based on plural input images captured by three cameras mounted on a shovel. Further, respective input image portions of two cameras corresponding to an overlap region of respective imaging ranges of two cameras among the three cameras are associated with each other to form a lattice pattern in the output image. The lattice pattern uses, as a unit pattern, lattice points divided by circles indicating mountains of a first wave when the position of a first camera is a wave source, circles indicating valleys of the first wave, circles indicating mountains of a second wave when the position of a second camera is a wave source, and circles indicating valleys of the second wave. Further, coordinates on an output image plane corresponding to the unit pattern through which an abdominal line formed by the first wave and the second wave passes are associated with coordinates on an input image plane of the first camera, and coordinates on an output image plane corresponding to a unit pattern through which a nodal line formed by the first wave and the second wave passes are associated with coordinates on an input image plane of the second camera. With such a configuration, the image generation device in the related art can prevent loss of an object while maintaining visibility of the object in an output image portion corresponding to an overlap region.

SUMMARY

According to an aspect of the invention, there is provided an image generation device that generates an output image based on a plurality of input images captured by a plurality of cameras attached to an operation target body, in which respective input image portions of two of the plurality of cameras corresponding to an overlap region of respective imaging ranges of two of the plurality of cameras are disposed to form a lattice pattern in the output image; the lattice pattern uses, as a unit pattern, lattice points divided by a circle indicating a mountain of a first wave when the position of a first camera is a wave source, a circle indicating a valley of the first wave, a circle indicating a mountain of a second wave when the position of a second camera is a wave source, and a circle indicating a valley of the second wave; values of pixels that form the unit pattern are values obtained by weight-averaging values of pixels of a first input image captured by the first camera and values of pixels of a second input image captured by the second camera; in one of a unit pattern through which an abdominal line formed by the first wave and the second wave passes and a unit pattern through which a nodal line formed by the first wave and the second wave passes, a weighted average value of the values of the pixels of the first input image relating to respective pixels is equal to or larger than a weighted average value of the values of the pixels of the second input image relating to the respective pixels, and in the other one thereof, a weighted average value of the values of the pixels of the first input image relating to respective pixels is equal to or smaller than a weighted average value of the values of the pixels of the second input image relating to the respective pixels; and a weight of a value of each pixel of the first input image and a weight of a value of each pixel of the second input image are determined according to a physical quantity relating to an amplitude of a composite wave of the first wave and the second wave.

Further, according to another aspect of the invention, there is provided an operation support system that supports a movement or an operation of an operation target body, including: the above-described image generation device; and a display unit that is provided in an operation room for moving or operating the operation target body and displays an output image generated by the image generation device.

BRIEF DESCRIPTION OF THE DRAWINGS

FIG. 7 is a flowchart illustrating a flow of a processing target generation process and an output image generation process.

FIG. 13 is a diagram illustrating a relationship between a decimal part of a coordinate value of a perpendicular line intersection and a weight α of a first pixel value.

FIG. 14 shows another display example of an output image.

DETAILED DESCRIPTION

However, in a case where resolution of an output image is low, the image generation device may cause deterioration of an appearance of an output image portion corresponding to an overlap region.

It is desirable to provide an image generation device capable of enhancing an appearance of an output image portion expressed by a pattern drawn by two waves, and an operation support system using the image generation device.

Through the above-described means, it is possible to provide an image generation device capable of enhancing an appearance of an output image portion expressed by patterns formed by two waves, and an operation support system using the image generation device.

Hereinafter, preferred embodiments for the invention will be described with reference to the accompanying drawings.

Figure 1:
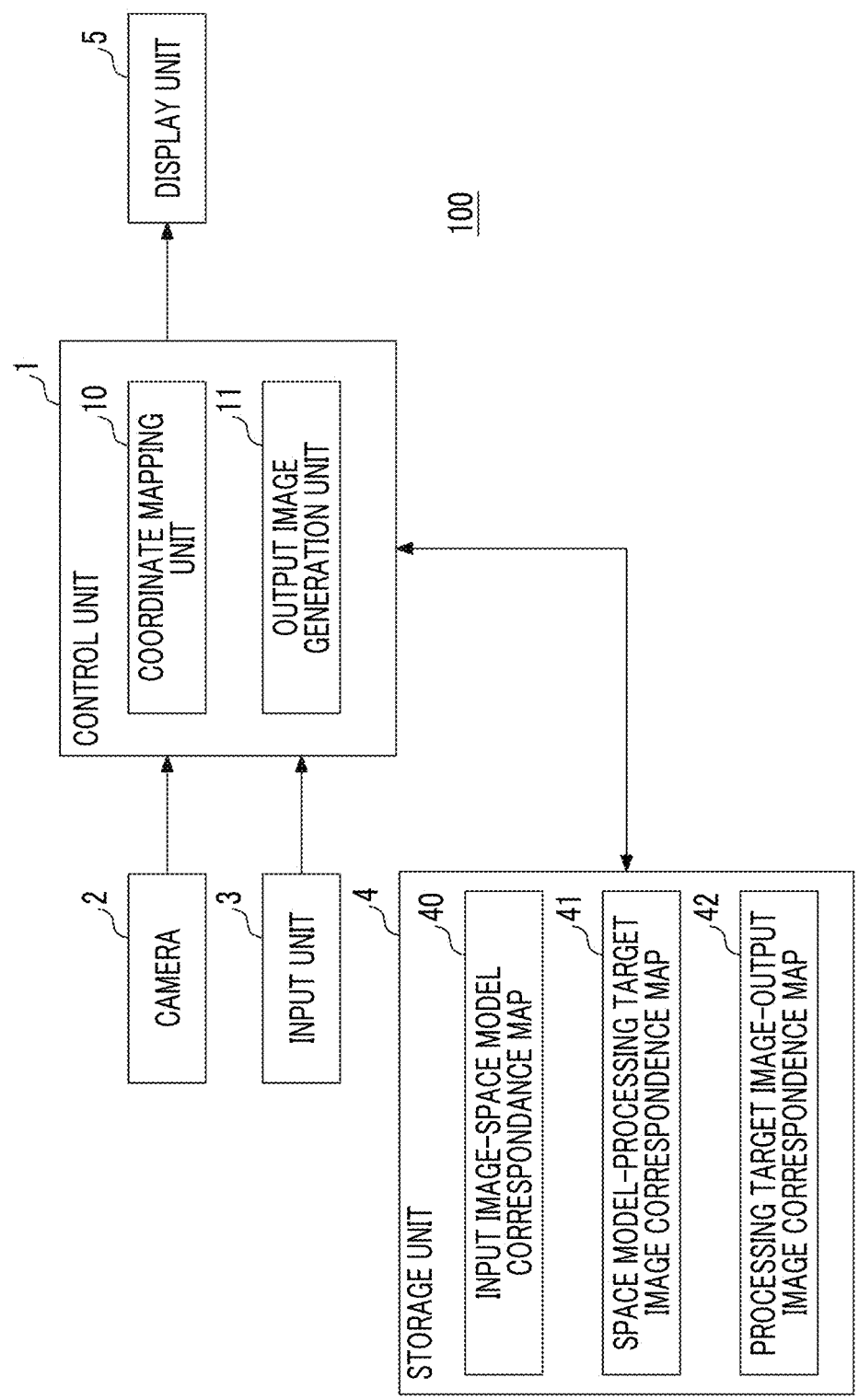
FIG. 1 is a block diagram schematically illustrating a configuration example of an image generation device according to an embodiment of the invention.

FIG. 1 is a block diagram schematically illustrating a configuration example of an image generation device 100 according to an embodiment of the invention.

The image generation device 100 is a device that generates an output image based on an input image captured by a camera 2 mounted on a construction machine and presents the output image to an operator, and includes a control unit 1, the camera 2, an input unit 3, a storage unit 4, and a display unit 5.

Figure 2:
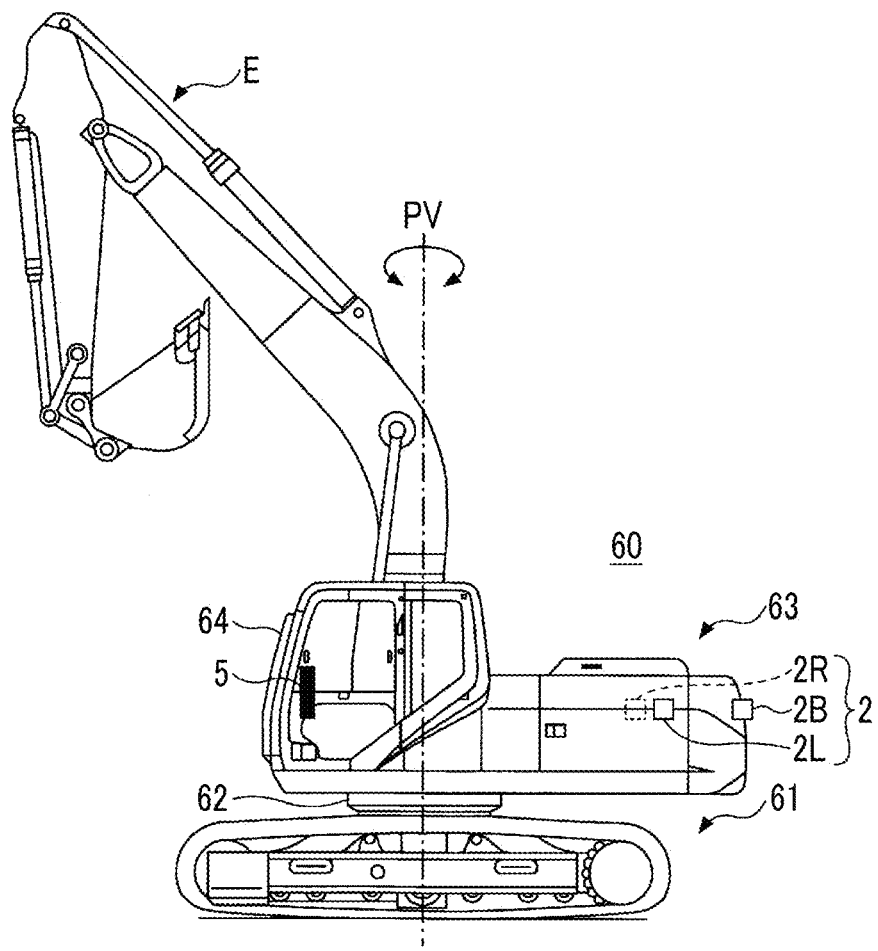
FIG. 2 is a diagram illustrating a configuration example of a shovel on which an image generation device is mounted.

FIG. 2 is a diagram illustrating a configuration example of a shovel 60 on which the image generation device 100 is mounted. The shovel 60 is configured so that an upper turning body 63 is mounted to be turned around a pivot PV on a lower traveling body 61 of a crawler type through a turning mechanism 62.

Further, the upper turning body 63 includes a cab (operator's cab) 64 in a front left part thereof, includes a drilling attachment E in a front center part thereof, and includes the camera 2 (a right-side camera 2R, a left-side camera 2L, and a rear camera 2B) on a right surface, a left surface, and a rear surface thereof. The display unit 5 is provided at a position that is easily viewed by the operator in the cab 64.

Then, the respective components of the image generation device 100 will be described.

A control unit 1 is a computer that includes a central processing unit (CPU), a random access memory (RAM), a read only memory (ROM), a non-volatile random access memory (NVRAM), and the like. The control unit 1 stores programs respectively corresponding to a coordinate mapping unit 10 and an output image generation unit 11 (which will be described later) in the ROM or the NVRAM, and causes the CPU to execute processes corresponding to the respective units while using the RAM as a temporary storage region.

The camera 2 is a device for acquiring an input image that reflects the periphery of the shovel 60, and for example, is attached to the right side surface, the left side surface, and the rear surface of the upper turning body 63 so that a region which becomes a blind spot with respect to the operator in the cab 64 can be imaged (see FIG. 2).

Further, the camera 2 acquires an input image according to a control signal from the control unit 1, and outputs the acquired input image to the control unit 1.

The input unit 3 is a device through which the operator can input a variety of information to the image generation device 100, and for example, is a touch panel, a button switch, a pointing device, a keyboard, or the like.

The storage unit 4 is a device for storing a variety of information, and for example, is a hard disk, an optical disc, a semiconductor memory, or the like.

The display unit 5 is a device for displaying image information, and for example, is a liquid crystal display, a projector, or the like, provided in the cab 64 (see FIG. 2) in the construction machine. The display unit 5 displays various images output by the control unit 1.

Further, the image generation device 100 generates a processing target image based on an input image, and performs an image conversion process with respect to the processing target image to generate an output image. In addition, the image generation device 100 presents the output image to the operator, so that the operator can recognize a positional relation or a distance sense between the shovel 60 and a peripheral obstacle.

The "processing target image" refers to an image generated based on an input image. Further, the processing target image refers to an image which is a target of an image conversion process such as scale conversion, affine conversion, distortion conversion or visual point conversion, for example. Further, the processing target image is obtained by projecting an input image to a predetermined space model, and then, re-projecting a projection image projected to the space model to another two-dimensional plane. In a case where the input image is used in an image conversion process, the projection to the space model is performed to prevent the input image from being unnaturally displayed. Specifically, in a case where an input image obtained by imaging the ground by a camera from above and including a horizontal image (for example, a sky portion) due to a wide angle of view is used in an image conversion process, the projection to the space model is performed to prevent an unnatural display such that it looks as if the sky portion is placed on the ground. The processing target image may be used as an output image as it is without performing the image conversion process.

The "space model" refers to an input image projection target that includes at least one or plural planes or curved surfaces including a plane other than a processing target image plane which is a plane where the processing target is placed or a curved surface. The plane other than the processing target image plane or the curved surface is a plane parallel with the processing target image plane or a plane that forms an angle with respect to the processing target image plane, or a curved surface, for example.

The image generation device 100 may perform an image conversion process with respect to a projection image projected to the space model without generating a processing target image to generate an output image. Further, the projection image may be used as an output image as it is without performing the image conversion process.

Figure 3A:
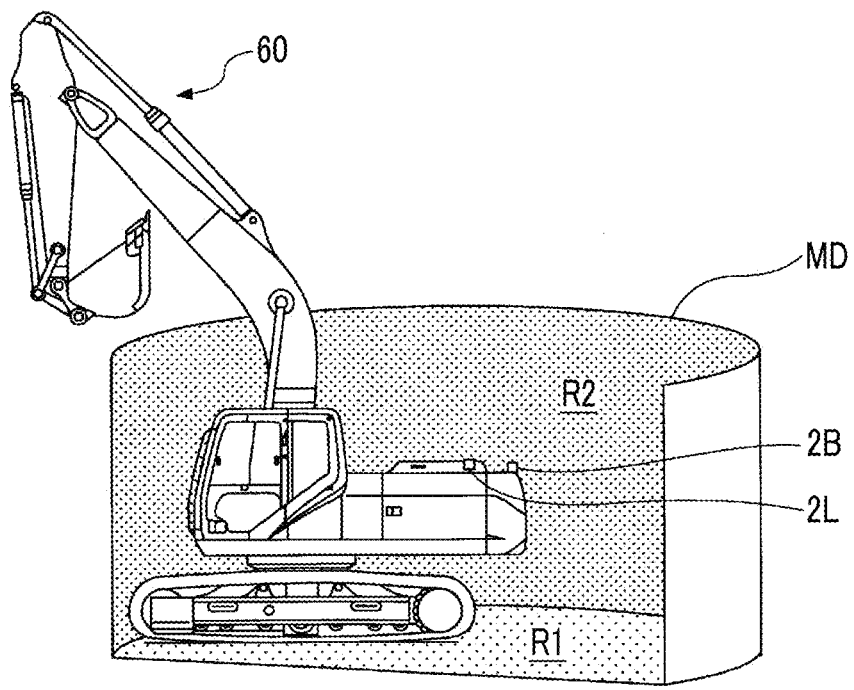
FIG. 3A is a diagram illustrating an example of a space model to which an input image is projected.
Figure 3B:
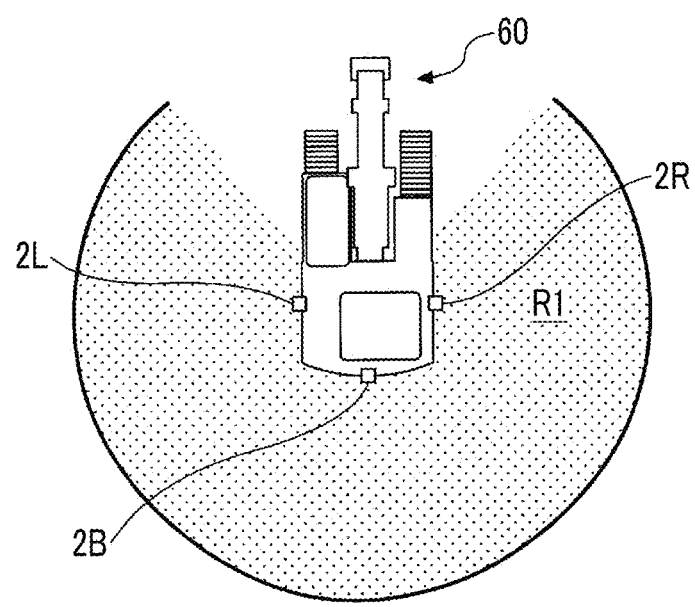
FIG. 3B is a diagram illustrating the example of the space model to which the input image is projected.

FIGS. 3A and 3B are diagrams illustrating an example of a space model MD to which an input image is projected, in which FIG. 3A shows a relationship between the shovel 60 and the space model MD when the shovel 60 is seen from the side, and FIG. 3B shows a relationship between the shovel 60 and the space model MD when the shovel 60 is seen from the top.

As shown in FIGS. 3A and 3B, the space model MD has an approximately cylindrical shape, and includes a plane region R1 on an inner bottom surface thereof and a curved surface region R2 on an inner side surface thereof.

Figure 4:
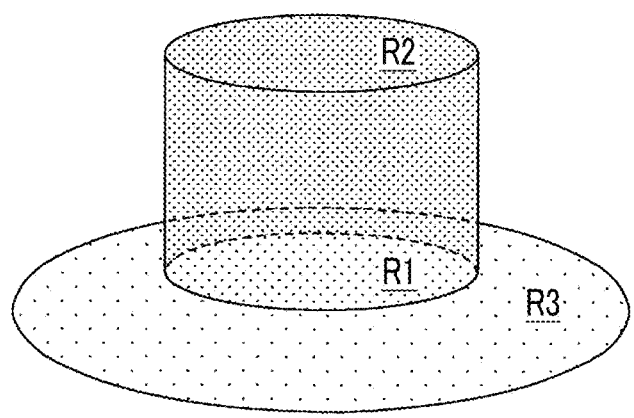
FIG. 4 is a diagram illustrating a relationship between a space model and a processing target image plane.

Further, FIG. 4 shows an example of a relationship between the space model MD and a processing target image plane. As shown in FIG. 4, a processing target image plane R3 is a plane including the plane region R1 of the space model MD. FIG. 4 shows that the space model MD is a cylindrical shape instead of the approximately cylindrical shape as shown in FIGS. 3A and 3B for clarity of description, but the space model MD may be either the approximately cylindrical shape or the cylindrical shape. This is similarly applied to the following drawings. In addition, the processing target image plane R3 may be a circular region including the plane region R1 of the space model MD as described above, or may be an annular region that does not include the plane region R1 of the space model MD.

Next, various units of the control unit 1 will be described.

The coordinate mapping unit 10 is a unit that performs mapping between coordinates on an input image plane where an input image captured by the camera 2 is placed, coordinates on the space model MD, and coordinates on the processing target image plane R3. Further, the coordinate mapping unit 10 performs mapping between the coordinates on the input image plane, the coordinates on the space model MD, and the coordinates on the processing target image plane R3 on the basis of various parameters relating to the camera 2 and a predetermined mutual positional relationship between the input image plane, the space model MD, and the processing target image plane R3. Further, the coordinate mapping unit 10 stores their correspondence relationship in an input image-space model correspondence map 40 and a space model-processing target image correspondence map 41 of the storage unit 4. The various parameters relating to the camera 2 includes an optical center, a focal distance, a CCD size, an optical axial vector, a camera horizontal vector, a projection type or the like of the camera 2, and may be predetermined values or may be values input through the input unit 3.

In a case where a processing target image is not generated, the coordinate mapping unit 10 do not perform mapping between the coordinates on the space model MD and the coordinates on the processing target image plane R3, and storage of their correspondence relationship in the space model-processing target image correspondence map 41.

The output image generation unit 11 is a unit that generates an output image, and for example, performs mapping between the coordinates on the processing target image plane R3 and coordinates on an output image plane where the output image is placed by performing scale conversion, affine conversion, or distortion conversion with respect to a processing target image. Further, the output image generation unit 11 stores their correspondence relationship in a processing target image-output image correspondence map 42 of the storage unit 4. In addition, the output image generation unit 11 associates values of respective pixels in an output image with values of respective pixels in an input image to generate an output image, with reference to the input image-space model correspondence map 40 and the space model-processing target image correspondence map 41. The values of the respective pixels include a luminance value, a hue value, a chroma value, or the like.

Further, the output image generation unit 11 performs mapping between the coordinates on the processing target image plane R3 and the coordinates on the output image plane on the basis of various parameters relating to a virtual camera, and stores their correspondence relationship in the processing target image-output image correspondence map 42 of the storage unit 4. Further, the output image generation unit 11 associates values of respective pixels in an output image with values of respective pixels in an input image to generate an output image, with reference to the input image-space model correspondence map 40 and the space model-processing target image correspondence map 41. The various parameters relating to the virtual camera include an optical center, a focal distance, a CCD size, an optical axial vector, a camera horizontal vector, a projection type or the like of the virtual camera, and may be predetermined values or values input through the input unit 3.

The output image generation unit 11 may change the scale of a processing target image to generate an output image without using the concept of the virtual camera.

Further, in a case where a processing target image is not generated, the output image generation unit 11 performs mapping between the coordinates on the space model MD and the coordinates on the output image plane according to a performed image conversion process. Further, the output image generation unit 11 associates values of respective pixels in an output image with values of respective pixels in an output image to generate an output image, with reference to the input image-space model correspondence map 40. In this case, the output image generation unit 11 do not perform mapping between the coordinates on the space model MD and the coordinates on the processing target image plane R3, and storage of their correspondence relationship in the processing target image-output image correspondence map 42.

Next, an example of specific processes in the coordinate mapping unit 10 and the output image generation unit 11 will be described.

The coordinate mapping unit 10 may perform mapping between coordinates on an input image plane and coordinates on a space model using a Hamiltonian quaternion, for example.

Figure 5:
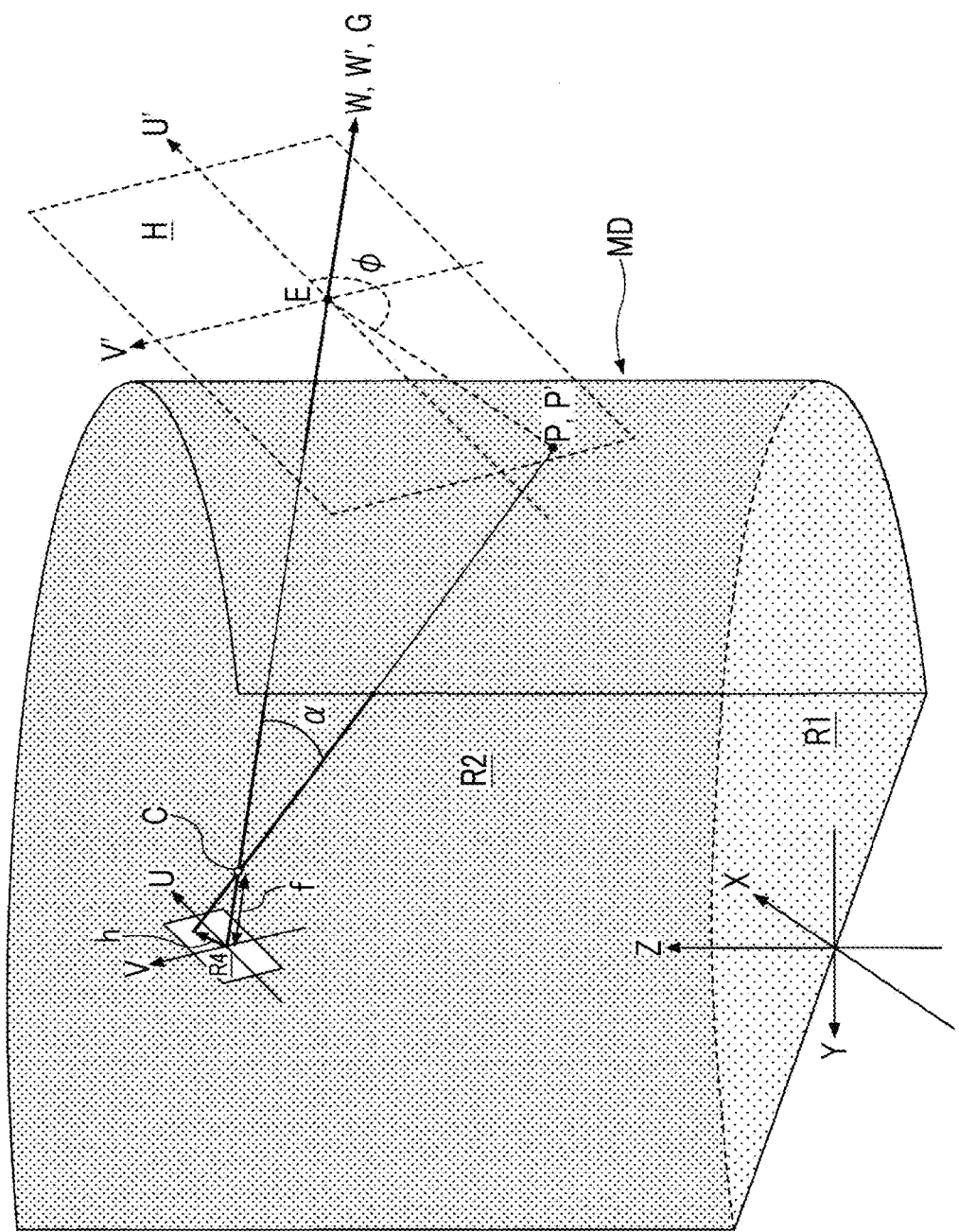
FIG. 5 is a diagram illustrating mapping between coordinates on an input image plane and coordinates on a space model.

FIG. 5 is a diagram illustrating mapping between coordinates on an input image plane and coordinates on a space model. In FIG. 5, an input image plane of the camera 2 is represented as one plane in a UVW orthogonal coordinate system in which an optical center C of the camera 2 is the origin, and the space model is represented as a three-dimensional surface in an XYZ orthogonal coordinate system.

The coordinate mapping unit 10 first linearly moves the origin of the XYZ coordinate system to the optical center C (the origin of the UVW coordinate system), and then, rotates the XYZ coordinate system so that an X-axis matches a U-axis, a Y-axis matches a V-axis, and a Z-axis matches a −W-axis. Thus, the coordinates on the space model (coordinates on the XYZ coordinate system) are converted into the coordinates on the input image plane (coordinates on the UVW coordinate system). Sign "−" in the −W-axis means that a direction thereof is reverse to the direction of the Z-axis. This is because the UVW coordinate system sets the front of the camera as a +W direction and the XYZ coordinate system sets a vertically downward direction as a −Z direction.

In a case where plural cameras 2 are present, each camera 2 has an individual UVW coordinate system. Thus, the coordinate mapping unit 10 linearly moves and rotates the XYZ coordinate system with respect to each of the plural UVW coordinate systems.

The above-mentioned conversion is realized by linearly moving the XYZ coordinate system so that the optical center C of the camera 2 becomes the origin of the XYZ coordinate system, and then, by rotating the XYZ coordinate system so that the Z-axis matches the −W-axis and rotating the XYZ coordinate system so that the X-axis matches the U-axis. The coordinate mapping unit 10 may describe this conversion by the Hamiltonian quaternion, to thereby reduce the two rotations into one-time rotational operation.

Here, a rotation for matching a certain vector A with another vector B corresponds to a process of rotating the vector A by an angle formed by the vector A and the vector B using a normal line with respect to a plane formed by the vector A and the vector B as an axis. Here, when the angle is θ, the angle θ is expressed by Expression (1) from an inner product of the vector A and the vector B.

$$\theta = \cos^{-1}\left(\frac{A \cdot B}{|A||B|}\right) \quad \text{[Expression 1]}$$

Further, a unit vector N of the normal line of the plane formed by the vector A and the vector B is expressed by Expression (2) from an outer product of the vector A and the vector B.

$$N = \frac{A \times B}{|A||B|\sin\theta} \quad \text{[Expression 2]}$$

In a case where i, j, and k are respectively set in the unit of imaginary numbers, the quaternion is a hypercomplex number that satisfies Expression (3).

$$ii=jj=kk=ijk=-1 \quad \text{[Expression 3]}$$

In this embodiment, a quaternion Q is expressed by Expression (4) where a real component is t and pure imaginary components are a, b, and c.

$$Q=(t;a,b,c)=t+ai+bj+ck \quad \text{[Expression 4]}$$

Further, a conjugate quaternion of the quaternion Q is expressed by Expression (5).

$$Q'=(t;-a,-b,-c)=t-ai-bj-ck \quad \text{[Expression 5]}$$

The quaternion Q may represent a three-dimensional vector (a, b, c) using the pure imaginary components a, b, and c in a state where the real component t is 0 (zero), and may represent a rotational operation using an arbitrary vector as an axis based on the respective components of t, a, b, and c.

Further, the quaternion Q may integrate plural times of continuous rotational operations to express the result as a one-time rotational operation, and for example, may represent a point D(ex, ey, ez) when an arbitrary point S(sx, sy, sz) is rotated by an angle θ using an arbitrary unit vector C(l, m, n) as an axis, as follows.

$$D = (0; ex, ey, ez) = QSQ^* \text{但し}, \quad \text{[Expression 6]}$$
$$S = (0; sx, sy, sz),$$
$$Q = \left(\cos\frac{\theta}{2}; l\sin\frac{\theta}{2}, m\sin\frac{\theta}{2}, n\sin\frac{\theta}{2}\right)$$

Here, in this embodiment, when a quaternion indicating a rotation for matching the Z-axis with the −W-axis is represented as Qz, since a point X on the X-axis in the XYZ coordinate system is moved to a point X', the point X' is expressed by Expression (7).

$$X'=Q_zXQ_z^* \quad \text{[Expression 7]}$$

Further, in this embodiment, when a quaternion indicating a rotation for matching a line that connects the point X' on the X-axis and the origin with the U-axis is represented as Qx, a quaternion R indicating a "rotation for matching the Z-axis with the −W-axis and matching the X-axis with the U-axis" is expressed by Expression (8).

$$R=Q_xQ_z \quad \text{[Expression 8]}$$

Coordinates P' when arbitrary coordinates P on the space model (XYZ coordinate system) are represented as coordinates on the input image plane (UVW coordinate system) are expressed by Expression (9).

$$P'=RPR^* \quad \text{[Expression 9]}$$

Since the quaternion R does not change in each camera 2, the coordinate mapping unit 10 may convert the coordinates on the space model (XYZ coordinate system) into the coordinates on the input image plane (UVW coordinate system) only by executing the calculation thereafter.

After converting the coordinates on the space model (XYZ coordinate system) into the coordinates on the input image plane (UVW coordinate system), the coordinate mapping unit 10 calculates an incident angle α formed by a line segment CP' that connects the optical center C (coordinates of the UVW coordinate system) of the camera 2 and the coordinates P' represented in the UVW coordinate system corresponding to the arbitrary coordinates P on the space model, and the optical axis G of the camera 2.

Further, the coordinate mapping unit 10 calculates a deflection angle φ formed by a line segment EP' that connects, in a plane H which is parallel to an input image plane R4 (for example, a CCD surface) of the camera 2, an intersection E between the plane H and the optical axis G and the coordinates P', and includes the coordinates P', and a U'-axis on the plane H, and the length of the line segment EP'.

In an optical system of a camera, since an image height h is normally a function of the incident angle α and the focal distance f, the coordinate mapping unit 10 calculates the image height h by selecting an appropriate projection method such as a normal projection (h=f tan α), an orthographic projection (h=f sin α), a stereographic projection (h=2f tan(α/2)), an equisolid angle projection (h=2f sin(α/2)), or an equidistant projection (h=fα).

Then, the coordinate mapping unit 10 resolves the calculated image height h into a U component and a V component on the UV coordinate system by the deflection angle φ and divides the result by a numerical value corresponding to a pixel size per pixel of the input image plane R4, to perform mapping between the coordinates P (P') on the space model MD and the coordinates on the input image plane R4.

When a pixel size per pixel of the input image plane R4 in a U-axis direction is represented as $a_U$ and a pixel size per pixel of the input image plane R4 in a V-axis direction is represented as $a_V$, coordinates (u, v) on the input image plane R4 corresponding to the coordinates P (P') on the space model MD are expressed by Expression (10) and Expression (11).

$$u = \frac{h\cos\phi}{a_U} \quad \text{[Expression 10]}$$

$$v = \frac{h\sin\phi}{a_V} \quad \text{[Expression 11]}$$

In this way, the coordinate mapping unit 10 performs mapping between the coordinates on the space model MD and one or plural sets of coordinates on the input image planes R4 which are present for each camera, and stores the coordinates on the space model MD, a camera identifier, and the coordinates on the input image plane R4 in the input image-space model correspondence map 40 in association.

Further, since the coordinate mapping unit 10 performs an operation for coordinate conversion using a quaternion, there is an advantage that gimbal lock does not occur, compared with a case where the operation for coordinate conversion is performed using an Euler angle. However, the invention is not limited to the operation for coordinate conversion using the quaternion, and the coordinate mapping unit 10 may perform the operation for coordinate conversion using an Euler angle.

In a case where mapping to plural coordinates on the input image plane R4 is possible, the coordinate mapping unit 10 may perform mapping between the coordinates P (P') on the space model MD and the coordinates on the input image plane R4 relating to a camera of which the incident angle α is the smallest, or may perform mapping between the coordinates P (P') on the space model MD and coordinates on the input image plane R4 selected by an operator.

Next, a process of re-projecting coordinates (coordinates having a component in a Z-axis direction) on the curved surface region R2 among the coordinates on the space model MD to the processing target image plane R3 on an XY plane will be described.

Figure 6A:
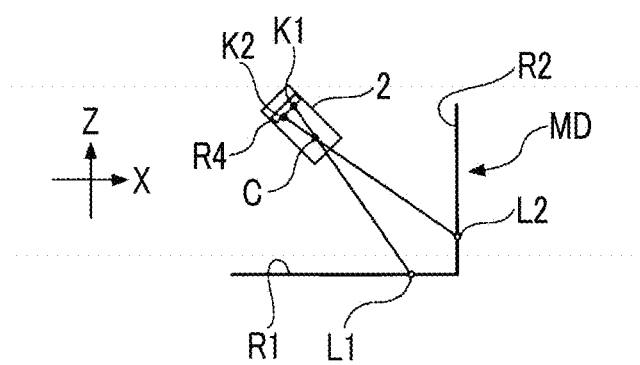
FIG. 6A is a diagram illustrating mapping between coordinates and coordinates using a coordinate mapping unit.

FIGS. 6A to 6D are diagrams illustrating mapping between coordinates and coordinates using the coordinate mapping unit 10. Further, FIG. 6A is a diagram illustrating a correspondence relationship between coordinates on the input image plane R4 and coordinates on the space model MD, of the camera 2 that employs the normal projection (h=f tan α), as an example. As shown in FIG. 2, the coordinate mapping unit 10 performs mapping between coordinates and coordinates so that respective line segments that connect the coordinates on the input image plane R4 and the coordinates on the space model MD corresponding to the coordinates, of the camera 2, passes through the optical center C of the camera 2.

In an example of FIG. 6A, the coordinate mapping unit 10 performs mapping from coordinates K1 on the input image plane R4 of the camera 2 to coordinates L1 on the plane region R1 of the space model MD, and performs mapping from coordinates K2 on the input image plane R4 of the camera 2 to coordinates L2 on the curved surface region R2 of the space model MD. Here, both of a line segment K1-L1 and a line segment K2-L2 pass through the optical center C of the camera 2.

In a case where the camera 2 employs a projection method (for example, an orthographic projection, a stereographic projection, an equisolid angle projection, an equidistant projection, or the like) other than the normal projection, the coordinate mapping unit 10 performs mapping from the coordinates K1 and K2 on the input image plane R4 of the camera 2 to the coordinates L1 and L2 on the space model MD according to each projection method.

Specifically, the coordinate mapping unit 10 performs mapping between the coordinates on the input image plane and the coordinates on the space model MD, on the basis of a predetermined function (for example, the orthographic projection (h=f sin α), the stereographic projection (h=2f tan (α/2)), the equisolid angle projection (h=2f sin(α/2)), the equidistant projection (h=fα), or the like). In this case, the line segment K1-L1 and the line segment K2-L2 do not pass through the optical center C of the camera 2.

Figure 6B:
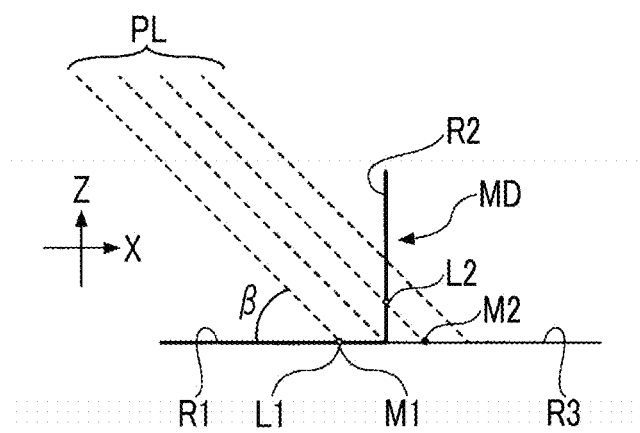
FIG. 6B is a diagram illustrating mapping between coordinates and coordinates using the coordinate mapping unit.

FIG. 6B is a diagram illustrating a correspondence relationship between coordinates on the curved surface region R2 of the space model MD and coordinates on the processing target image plane R3. As shown in FIG. 6B, the coordinate mapping unit 10 introduces a parallel line group PL which is placed on an XZ plane and forms an angle β with respect to the processing target image plane R3, and performs mapping between coordinates and coordinates so that both of coordinates on the curved surface region R2 of the space model MD and coordinates on the processing target image plane R3 corresponding to the former coordinates are placed on one of the parallel line group PL.

In an example of FIG. 6B, the coordinate mapping unit 10 performs mapping coordinates and coordinates so that coordinates L2 on the curved surface region R2 of the space model MD and coordinates M2 on the processing target image plane R3 are placed on a common parallel line.

The coordinates mapping unit 10 may perform mapping from coordinates on the plane region R1 of the space model MD to coordinates on the processing target image plane R3 using the parallel line group PL, similar to the coordinates on the curved surface region R2. However, in the example of FIG. 6B, since the plane region R1 and the processing target image plane R3 forms a common plane, the coordinates L1 on the plane region R1 of the space model MD and the coordinates M1 on the processing target image plane R3 have the same coordinate values.

In this way, the coordinate mapping unit 10 performs mapping between the coordinates on the space model MD and the coordinates on the processing target image plane R3, and stores the coordinates on the space model MD and the coordinates on the processing target image plane R3 in the space model-processing target image correspondence map 41 in association.

Figure 6C:
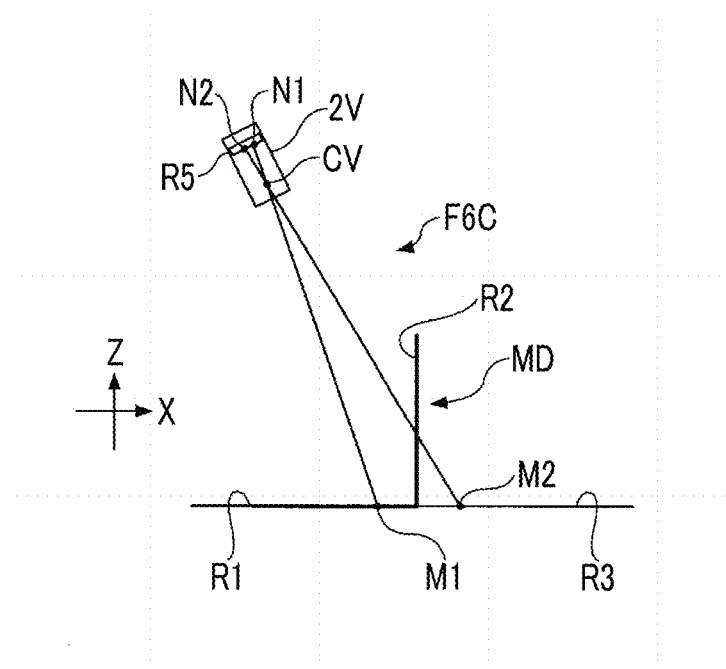
FIG. 6C is a diagram illustrating mapping between coordinates and coordinates using the coordinate mapping unit.

FIG. 6C is a diagram illustrating a correspondence relationship between coordinates on the processing target image plane R3 and coordinates on an output image plane R5 of a virtual camera 2V that employs a normal projection (h=f tan α), for example. As shown in FIG. 6C, the output image generation unit 11 performs mapping between coordinates and coordinates so that respective line segments that connect the coordinates on the output image plane R5 and the coordinates on the processing target image plane R3 corresponding to the coordinates, of the virtual camera 2V, pass through the optical center CV of the virtual camera 2V.

In an example of FIG. 6C, the output image generation unit 11 performs mapping from coordinates N1 on the output image plane R5 of the virtual camera 2V to coordinates M1 on the processing target image plane R3 (plane region R1 of the space model MD), and performs mapping from coordinates N2 on the output image plane R5 of the virtual camera 2V to coordinates M2 on the processing target image plane R3. Here, both of a line segment M1-N1 and a line segment M2-N2 pass through the optical center CV of the virtual camera 2V.

In a case where the virtual camera 2V employs a projection method (for example, an orthographic projection, a stereographic projection, an equisolid angle projection, an equidistant projection, or the like) other than the normal projection, the output image generation unit 11 performs mapping from the coordinates N1 and N2 on the output image plane R5 of the virtual camera 2V to the coordinates M1 and M2 on the processing target image plane R3, according to each projection method.

Specifically, the output image generation unit 11 performs mapping between coordinates on the output image plane R5 and coordinates on the processing target image plane R3 on the basis of a predetermined function (for example, an orthographic projection (h=f sin α), a stereographic projection (h=2f tan(α/2)) an equisolid angle projection (h=2f sin(α/2)), or an equidistant projection (h=fα)). In this case, the line segment M1-N1 and the line segment M2-N2 do not pass through the optical center CV of the virtual camera 2V.

In this way, the output image generation unit 11 performs mapping between the coordinates on the output image plane R5 and the coordinates on the processing target image plane R3, stores the coordinates on the output image plane R5 and the coordinates on the processing target image plane R3 in the processing target image-output image correspondence map 42 in association, and associates values of respective pixels in an output image with values of respective pixels in an input image to generate an output image, with reference to the input image-space model correspondence map 40 and the space model-processing target image correspondence map 41 stored by the coordinate mapping unit 10.

Figure 6D:
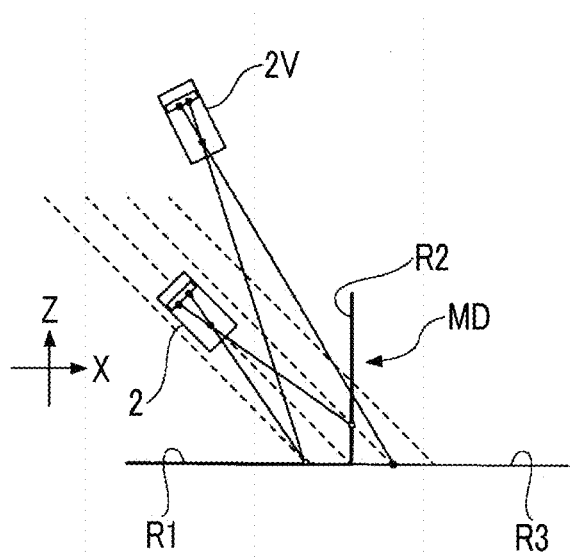
FIG. 6D a diagram illustrating mapping between coordinates and coordinates using the coordinate mapping unit.

FIG. 6D is a diagram illustrating a combination of FIGS. 6A to 6C, which shows a mutual position relationship between the camera 2, the virtual camera 2V, the plane region R1 and the curved region R2 of the space model MD, and the processing target image plane R3.

Next, a process of generating a processing target image by the image generation device 100 (hereinafter, referred to as a "processing target image generation process"), and a process of generating an output image using the generated processing target image (hereinafter, referred to as an "output image generation process") will be described with reference to FIG. 7. FIG. 7 is a flowchart illustrating a flow of the processing target image generation process (step S1 to step S3) and the output image generation process (step S4 to step S6). Further, arrangement of the camera 2 (input image plane R4), the space model (plane region R1 and curved surface region R2), and the processing target image plane R3 is determined in advance.

First, the control unit 1 performs mapping between coordinates on the processing target image plane R3 and coordinates on the space model MD by the coordinate mapping unit 10 (step S1).

Specifically, the coordinate mapping unit 10 acquires an angle formed by the parallel line group PL and the processing target image plane R3, and calculates a point at which one line of the parallel line group PL that extends from specific coordinates on the processing target image plane R3 intersects the curved surface region R2 of the space model MD. Further, the coordinate mapping unit 10 derives coordinates on the curved surface region R2 corresponding to the calculated point as specific coordinates on the curved surface region R2 corresponding to the specific coordinates on the processing target image region R3, and stores their correspondence relationship in the space model-processing target image correspondence map 41. The angle formed by the parallel line group PL and the processing target image plane R3 may be a value stored in advance in the storage unit 4 or the like, or may be a value dynamically input by an operator through the input unit 3.

Further, in a case where the specific coordinates on the processing target image plane R3 match specific coordinates on the plane region R1 of the space model MD, the coordinate mapping unit 10 derives the specific coordinates on the plane region R1 as specific coordinates corresponding to the specific coordinates on the processing target image plane R3, and stores their correspondence relationship in the space model-processing target image correspondence map 41.

Then, the control unit 1 performs mapping between the specific coordinates on the space model MD derived in the above-described process and the coordinates on the input image plane R4 by the coordinate mapping unit 10 (step S2).

Specifically, the coordinate mapping unit 10 acquires coordinates of the optical center C of the camera 2 that employs the normal projection (h=f tan α), and calculates a point at which a line segment that extends from specific coordinates on the space model MD and passes through the optical center C intersects the input image plane R4. Further, the coordinate mapping unit 10 derives coordinates on the input image plane R4 corresponding to the calculated point as specific coordinates on the input image plane R4 corresponding to the specific coordinates on the space model MD, and stores their correspondence relationship in the input image-space model correspondence map 40.

Then, the control unit 1 determines whether mapping from all coordinates on the processing target image plane R3 to coordinates on the space model MD and coordinates on the input image plane R4 is performed (step S3). In a case where it is determined that the mapping is not yet performed with respect to all the coordinates (NO in step S3), the processes of step S1 and step S2 are repeated.

On the other hand, in a case where it is determined that the mapping is performed with respect to all the coordinates (YES in step S3), in a state where the process target image generation process is terminated, the control unit 1 starts the output image generation process. Then, mapping between the coordinates on the processing target image plane R3 and the coordinates on the output image plane R5 is performed by the output image generation unit 11 (step S4).

Specifically, the output image generation unit 11 generates an output image by performing scale conversion, affine conversion, or distortion conversion with respect to a processing target image, and stores a correspondence relationship between coordinates on the processing target image plane R3 and coordinates on the output image plane R5, determined by the contents of the performed scale conversion, affine conversion, or distortion conversion in the processing target image-output image correspondence map 42.

Alternatively, in a case where an output image is generated using the virtual camera 2V, the output image generation unit 11 may calculate the coordinates on the output image plane R5 from the coordinates on the processing target image plane R3 according to an employed projection method, and may store their correspondence relationship in the processing target image-output image correspondence map 42.

Alternatively, in a case where an output image is generated using the virtual camera 2V that employs the normal projection ($h = f \tan \alpha$), in a state where coordinates of the optical center CV of the virtual camera 2V are acquired, the output image generation unit 11 calculates a point at which a line segment that extends from specific coordinates on the output image plane R5 and passes through the optical center CV intersects the processing target image plane R3. Further, the output image generation unit 11 may derive coordinates on the processing target image plane R3 corresponding to the calculated point as specific coordinates on the processing target image plane R3 corresponding to the specific coordinates on the output image plane R5, and may store their correspondence relationship in the processing target image-output image correspondence map 42.

Then, the control unit 1 makes reference to the input image-space model correspondence map 40, the space model-processing target image correspondence map 41, and the processing target image-output image correspondence map 42 by the output image generation unit 11. Further, the control unit 1 follows the correspondence relationship between the coordinates on the input image plane R4 and the coordinates on the space model MD, the correspondence relationship between the coordinates on the space model MD and the coordinates on the processing target image plane R3, and the correspondence relationship between the coordinates on the processing target image plane R3 and the coordinates on the output image plane R5. In addition, the control unit 1 acquires a value (for example, a luminance value, a hue value, a chroma value, or the like) of a pixel specified by the coordinates on the input image plane R4 corresponding to each set of coordinates on the output image plane R5. Furthermore, the control unit 1 employs the acquired value as a value of a pixel specified by each set of coordinates on the corresponding output image plane R5 (step S5). That is, the output image generation unit 11 associates values of pixels in an output image with values of pixels in an input image to generate an output image. In a case where plural sets of coordinates on the plural input image planes R4 correspond to one set of coordinates of the output image plane R5, the output image generation unit 11 may derive a statistic value (for example, an average value, a maximum value, a minimum value, a middle value, or the like) based on respective values of plural pixels specified by the plural sets of coordinates on the plural input image planes R4, and may employ the statistic value as a value of one pixel specified by one set of coordinates on the output image plane R5.

Then, the control unit 1 determines whether mapping from all pixel values on the output image to pixel values on the input image is performed (step S6), and in a case where it is determined that the mapping is not yet performed with respect to all the pixel values (NO in step S6), the processes of step S4 and step S5 are repeated.

On the other hand, in a case where it is determined that the mapping is performed with respect to all the pixel values (YES in step S6), the control unit 1 generates an output image and terminates the series of processes.

When the image generation device 100 does not generate a processing target image, the processing target image generation process is not performed. In this case, "coordinates on a processing target image plane" in step S4 in the output image generation process is read as "coordinates on a space model".

With such a configuration, the image generation device 100 can generate a processing target image and an output image capable of causing an operator to intuitively recognize a positional relationship between a construction machine and peripheral obstacles.

Further, the image generation device 100 can thereby reliably perform mapping between each set of coordinates on the processing target image plane R3 and one or plural sets of coordinates on the input image plane R4 by executing coordinate mapping so as to go back to the input image plane R4 from the processing target image plane R3 through the space model MD. Further, the image generation device 100 can generate an excellent processing target image at high speed, compared with a case where coordinate mapping is executed in the order from the input image plane R4 to the processing target image plane R3 through the space model MD. In a case where the coordinate mapping is executed in the order from the input image plane R4 to the processing target image plane R3 through the space model MD, it is possible to reliably perform mapping between each set of coordinates on the input image plane R4 and one or plural sets of coordinates on the processing target image plane R3. However, there is a case where mapping from a part of the sets of the coordinates on the processing target image plane R3 to any set of coordinates on the input image plane R4 is not performed. In this case, it is necessary to perform an interpolation process or the like with respect to a part of the sets of the coordinates on the processing target image plane R3.

Further, in a case where only an image corresponding to the curved surface region R2 of the space model MD is enlarged or reduced, the image generation device 100 simply changes the angle formed by the parallel line group PL and the processing target image plane R3 and re-writes only a portion relating to the curved surface region R2 in the space model-processing target image correspondence map 41, to thereby make it possible to realize desired enlargement or reduction without re-writing the content of the input image-space model correspondence map 40.

Further, in a case where a visual performance of an output image is changed, the image generation device 100 simply changes values of various parameters relating to scale conversion, affine conversion or distortion conversion and re-writes the processing target image-output image correspondence map 42, to thereby make it possible to generate a desired output image (a scale-converted image, an affine-converted image or a distortion-converted image) without re-writing the content of the input image-space model correspondence map 40 and the space model-processing target image correspondence map 41.

Similarly, in a case where a viewpoint of an output image is changed, the image generation device 100 simply changes values of various parameters of the virtual camera 2V and re-writes the processing target image-output image correspondence map 42, to thereby make it possible to generate an output image (viewpoint-converted image) seen from a desired viewpoint without re-writing the content of the input image-space model correspondence map 40 and the space model-processing target image correspondence map 41.

Figure 8:
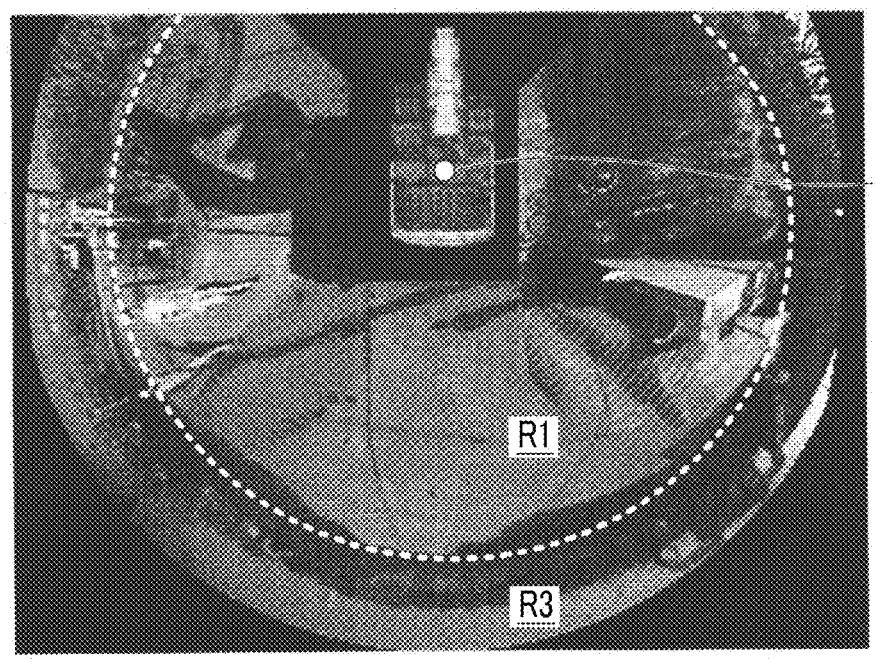
FIG. 8 shows a display example of an output image.

Next, a configuration example of an output image will be described with reference to FIG. 8. FIG. 8 is a display example when an output image generated using input images of three cameras 2 (a right-side camera 2R, a left-side camera 2L, and a rear camera 2B) mounted on the shovel 60 is displayed on the display unit 5.

The image generation device 100 re-projects the respective input images from the three cameras 2 to the processing target image plane R3, in a state of being projected to the plane region R1 and the curved surface region R2 of the space model MD, to generate a processing target image. Further, the image generation device 100 generates an output image by performing an image conversion process (for example, scale conversion, affine conversion, distortion conversion, viewpoint conversion, or the like) with respect to the generated processing target image. In addition, the image generation device 100 simultaneously displays an image (image in the plane region R1) obtained when performing imaging while looking down the vicinity of the shovel 60 from the sky and an image (image in the processing target image plane R3) obtained when performing imaging while viewing the periphery from the shovel 60 in the horizontal direction.

In a case where the image generation device 100 does not generate a processing target image, the output image is generated by performing an image conversion process (for example, viewpoint conversion) with respect to an image projected to the space model MD.

Further, the output image is circularly trimmed so that an image can be displayed without discomfort when the shovel 60 performs a turning operation, and is generated so that the center CTR of the circle is on the pivot PV of the shovel 60 on a cylindrical central axis of the space model MD, and is displayed to rotate around the center CTR according to the turning operation of the shovel 60. In this case, the cylindrical central axis of the space model MD may or may not match a re-projection axis.

The radius of the space model MD is 5 meters, for example. In a case where an object (for example, an operator) is present at a position spaced away from the turning center of the shovel 60 by a maximum arrival distance (for example, 12 meters) of the drilling attachment E, the angle formed by the parallel line group PL and the processing target image plane R3 may be set so that the object is sufficiently largely (for example, 7 meters or larger) displayed on the display unit 5.

Further, in the output image, a computer graphics (CG) image of the shovel 60 may be disposed so that the front of the shovel 60 matches an upper portion of the screen of the display unit 5 and the turning center of the shovel 60 matches the center CTR. Thus, it is possible to easily understand a positional relationship between the shovel 60 and the object in the output image. At the periphery of the output image, frame images including a variety of information such as directions may be arranged.

Figure 9A:
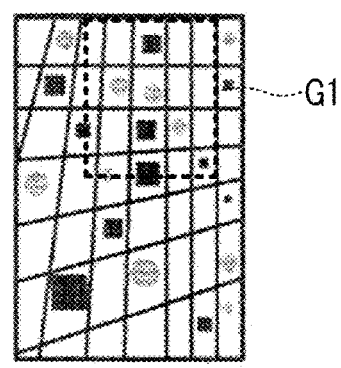
FIG. 9A is a diagram illustrating an effect of an interpolation process using an output image generation unit.
Figure 9B:
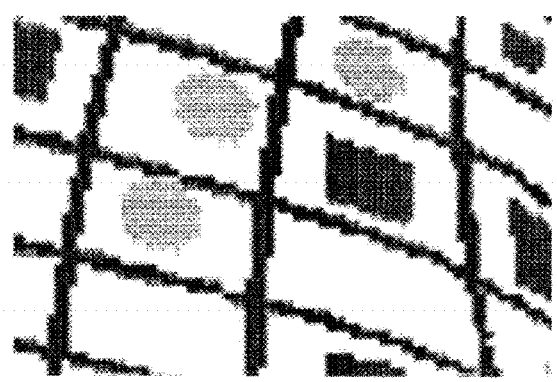
FIG. 9B is a diagram illustrating the effect of the interpolation process using the output image generation unit.
Figure 9C:
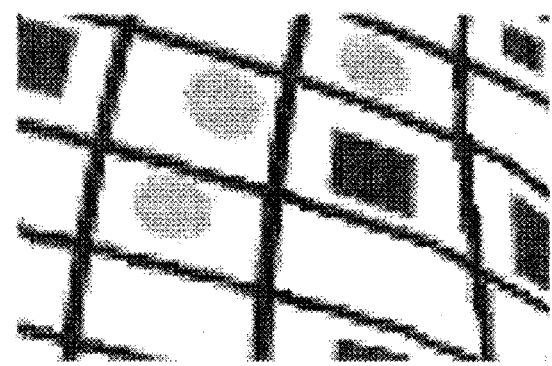
FIG. 9C is a diagram illustrating the effect of the interpolation process using the output image generation unit.

Next, jaggies generated in an output image will be described with reference to FIGS. 9A to 9C. FIGS. 9A to 9C are diagram illustrating effects of an interpolation process performed by the output image generation unit 11. FIG. 9A shows an input image, FIG. 9B shows an output image for which an interpolation process is not performed, and FIG. 9C shows an output image for which an interpolation is performed. Further, the output images of FIGS. 9B and 9C are images obtained by rotating a part of an input image indicated by a dotted-line region G1 in FIG. 9A in a counterclockwise direction and enlarging the result.

Jaggies occur in contours of a raster image, and for example, are generated due to a rounding error when a real number coordinate point on an input image plane is converted into an integer coordinate point so as to rotate an input image to generate an output image.

Both of coordinate values for specifying a pixel on the input image and coordinate values for specifying a pixel on the output image are represented as integer values. However, when coordinates on the input image plane corresponding to coordinates on the output image plane are derived, the coordinate values on the input image plane may be calculated as real number values (including a decimal part). In this case, the real number values may be converted into integer values through rounding off values after the decimal point, for example. This is because it is not possible to use the real number values as the coordinate values for specifying the pixel on the input image. Accordingly, the pixel (hereinafter, referred to an "output pixel") specified by an integer coordinate point on the output image plane is associated with a pixel specified by an integer coordinate point which is closest to a real number coordinate point on the input image plane. Further, for example, even when a real number coordinate point is present between two integer coordinate points for specifying two pixels having totally different luminance values, the pixel on the output image is associated with a pixel specified by one of two integer coordinate points on the input image plane. In addition, a value of a pixel specified by the other one of two integer coordinate points is not reflected in the value of the pixel on the output image. As a result, a contour of each image included in the output image is jagged.

In this way, the jaggies occur due to a rounding error in rounding off. Further, the jaggies are more noticeable as the resolution of the display unit 5 becomes lower.

Thus, the output image generation unit 11 reduces the jaggies using the interpolation process described with reference to FIGS. 10 and 11.

Figure 10:
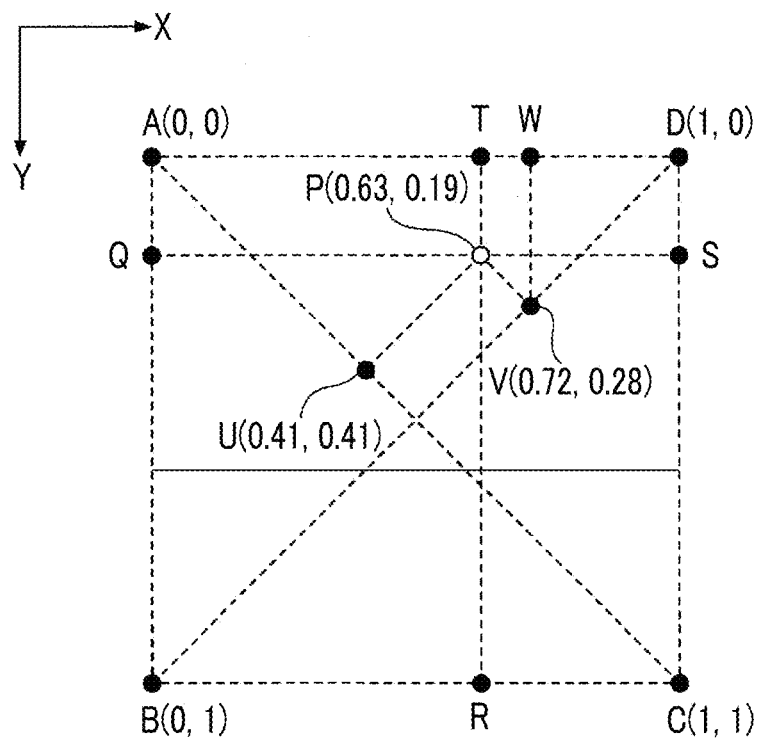
FIG. 10 is a diagram schematically illustrating an interpolation process.

FIG. 10 is a diagram schematically illustrating an interpolation process, which shows a part of an input image plane. The input image plane is represented by an XY orthogonal coordinate system, and includes integer coordinate points A(0, 0), B(0, 1), C(1, 1), and D(1, 0). Further, FIG. 11 is a functional block diagram illustrating a configuration example of the output image generation unit 11.

Figure 11:
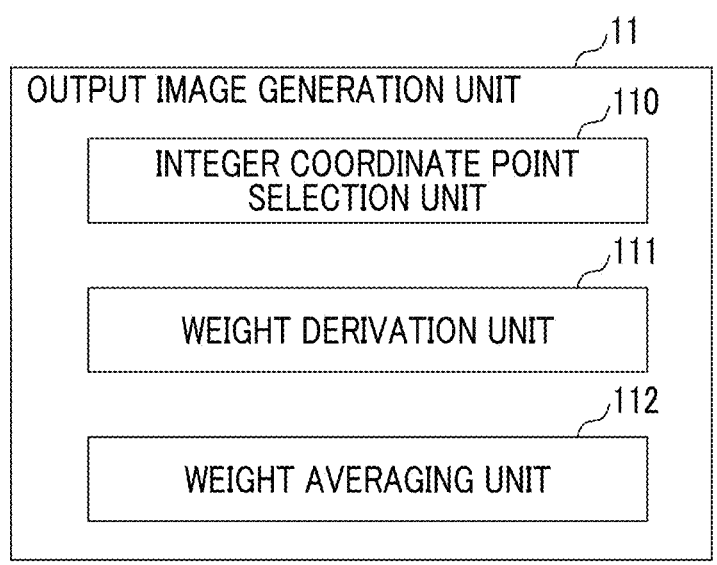
FIG. 11 is a functional block diagram illustrating a configuration example of the output image generation unit.

In this embodiment, as shown in FIG. 11, the output image generation unit 11 includes an integer coordinate point selection unit 110, a weight derivation unit 111, and a weight averaging unit 112.

The integer coordinate point selection unit 110 is a functional element that selects two integer coordinate points from two or more integer coordinate points which are close to a real number coordinate point (hereinafter, referred to as a "corresponding real number coordinate point") on an input image plane corresponding to an output pixel. In this embodiment, the corresponding real number coordinate point is a coordinate point derived by the output image generation unit 11 using the relationship described with reference to FIG. 5 and FIGS. 6A and 6D. Further, in this embodiment, the integer coordinate point selection unit 110 selects two integer coordinate points from four integer coordinate points in the vicinity of the corresponding real number coordinate point. Specifically, as shown in FIG. 10, four integer coordinates in the vicinity of the corresponding real number coordinate point P(0.63, 0.19) are A(0, 0), B(0, 1), C(1, 1), and D(1, 0). Further, the integer coordinate point selection unit 110 selects one of six combinations (pairs of integer coordinate points) of A-B, A-C, A-D, B-C, B-D, and C-D.

In this embodiment, the integer coordinate point selection unit 110 draws a perpendicular line from the corresponding real number coordinate point P to each of six line segments AB, AC, AD, BC, BD, and CD. Further, the integer coordinate point selection unit 110 selects a perpendicular line PV which is shortest from six perpendicular lines PQ, PR, PS, PT, PU, and PV and a line segment BD relating to the perpendicular line PV, and selects two integer coordinate points B and D relating to the line segment BD.

Further, in this embodiment, an interval between integer coordinate points in the X-axis direction and the Y-axis direction is value "1", and four integer coordinate points A, B, C, and D form a square. Thus, Y coordinate values of real number coordinate points Q(0.00, 0.19) and S(1.00, 0.19) are all equal to a Y coordinate value of the corresponding real number coordinate point P (0.63, 0.19). Similarly, X coordinate values of real number coordinate points R(0.63, 1.00) and T(0.63, 0.00) are equal to an X coordinate value of the corresponding real number coordinate point P(0.63, 0.19).

Further, since a real number coordinate point U(0.41, 0.41) is a real number coordinate point on the line segment AC, an increment of an X coordinate value and an increment of a Y coordinate value with respect to the real number coordinate point A are equal to each other. Similarly, with respect to a real number coordinate point on the line segment PV, an increment of an X coordinate value and an increment of a Y coordinate value with respect to the corresponding real number coordinate point P are equal to each other.

In addition, since a real number coordinate point U(0.72, 0.28) is a real number coordinate point on the line segment BD, an increment of an X coordinate value and an increment of a Y coordinate value with respect to the integer coordinate point B are equal to each other. Similarly, with respect to a real number coordinate point on the line segment UP, an increment of an X coordinate value and an increment of a Y coordinate value with respect to the real number coordinate point U are equal to each other.

Thus, an X coordinate value and a Y coordinate value of the real number coordinate point U are all "0.41" obtained by dividing a sum "0.82" of the X coordinate value and the Y coordinate value of the corresponding real number coordinate point P by 2. Further, an X coordinate value of the real number coordinate point V is "0.72" obtained by adding "0.09" obtained by dividing "0.18" obtained by subtracting the sum "0.82" from the value "1" by 2 to "0.63" which is the X coordinate value of the corresponding real number coordinate point P. Further, a Y coordinate value of the real number coordinate point V is "0.28" obtained by adding "0.09" obtained by dividing the difference "0.18" by 2 to "0.19" which is the Y coordinate value of the corresponding real number coordinate point P.

In this way, the coordinate values of the real number coordinate points Q to V may be directly derived from the coordinate values of the corresponding real number coordinate point P, or may be derived through simple operations such as addition, subtraction, or division into two equal parts. Thus, the above-described selection method for selecting two integer coordinate points from four integer coordinate points in the vicinity of the corresponding real number coordinate point is a selection method suitable for a binary arithmetic operation.

The weight derivation unit 111 is a functional element that derives a weight of each input pixel value when an output pixel value is determined from two pixels (hereinafter, referred to as "input pixels") values specified by two selected integer coordinate points.

In this embodiment, in a case where two integer coordinate points Band Dare selected, the weight derivation unit 111 derives a ratio of the length of the line segment BV to the length of the line segment BD as a weight $\alpha$ of the input pixel value specified by the integer coordinate point D. Further, the weight derivation unit 111 derives a ratio of the length of the line segment VD to the length of the line segment BD as a weight $\beta$ ($=1-\alpha$) of the input pixel value specified by the integer coordinate point B.

Specifically, as shown in FIG. 10, a decimal part of the X coordinate value of the real number coordinate point V corresponds to a ratio of the length of the line segment AW to the length "1" of the line segment AD. The real number coordinate point W is an intersection of a perpendicular line drawn from the real number coordinate point V with respect to the line segment AD. Further, the ratio of the length of the line segment BV to the length of the line segment BD is equal to the ratio of the length of the line segment AW to the length of the line segment AD. Thus, the weight derivation unit 111 employs the decimal part of the X coordinate value of the real number coordinate point V as the weight $\alpha$ of the input pixel value specified by the integer coordinate point D. Further, the weight derivation unit 111 employs a decimal part of the Y coordinate value of the real number coordinate point Vas the weight $\beta$ of the input pixel value specified by the integer coordinate point B. The decimal part of the Y coordinate value of the real number coordinate point V corresponds to $1-\alpha$ which is a value obtained by subtracting the decimal part of the X coordinate value of the real number coordinate point V from the value "1". In this way, the weight derivation unit 111 directly derives the weights $\alpha$ and $\beta$ from the coordinate values of the corresponding real number coordinate point P, to thereby make it possible to omit a relatively complicated arithmetic operation such as calculation of the ratios.

The weight averaging unit 112 is a functional element that weight-averages two input pixel values. In this embodiment, the weight averaging unit 112 weight-averages two input pixel values using the weights α and β derived by the weight derivation unit 111. Specifically, the weight averaging unit 112 multiplies a value of one pixel (hereinafter, referred to as a "first pixel") among two input pixels by the weight α, to calculate a contribution amount of the first pixel value in an output pixel value. Further, the weight averaging unit 112 multiplies a value of the other pixel (hereinafter, referred to as a "second pixel") among the two input pixels by the weight β, to calculate a contribution amount of the second pixel value in the output pixel value. In addition, the weight averaging unit 112 derives a weighted average of two input pixel values which is the sum of the contribution amount of the first pixel value and the contribution amount of the second pixel value as the output pixel value.

For example, in a case where luminance values of two input pixels specified by the integer coordinate points B and D are weight-averaged, the weight averaging unit 112 uses the coordinate values of the real number coordinate point V. Specifically, the weight averaging unit 112 multiplies a luminance value of an input pixel (first pixel) specified by the integer coordinate point D by the decimal part (weight α) of the X coordinate value of the real number coordinate point V to calculate a contribution amount of the luminance value of the first pixel. Further, the weight averaging unit 112 multiplies a luminance value of an input pixel (second pixel) specified by the integer coordinate point B by the decimal part (weight β) of the Y coordinate value of the real number coordinate point V to calculate a contribution amount of the luminance value of the second pixel. In addition, the weight averaging unit 112 adds up the contribution amount of the luminance value of the first pixel and the contribution amount of the luminance value of the second pixel to derive a luminance value of an output pixel.

Further, in the above-described embodiment, a case where the perpendicular line PV is shortest is described, but the same description may be applied to a case where another perpendicular line is shortest.

The above-described interpolation method is applied to a case where the corresponding real number coordinate point P is present at a position other than four integer coordinate points A to D. Thus, in a case where the corresponding real number coordinate point P is present at any one of the integer coordinate points A to D, the output image generation unit 11 employs a value of one input pixel specified by the corresponding real number coordinate point P which is an integer coordinate point as an output pixel value as it is, without executing selection of two integer coordinate points, weight derivation and weight averaging. Further, in a case where there are two or more shortest perpendicular lines among six perpendicular lines, the output image generation unit 11 determines selection of which one among the perpendicular lines of the same length in advance. For example, the output image generation unit 11 may select one perpendicular line based on a predetermined priority. Further, the above-described interpolation method is applied to a case where both of the X coordinate value and the Y coordinate value of the corresponding real number coordinate point P are 0 or greater and 1 or less, but the interpolation method may be similarly applied to a case where the X coordinate value and the Y coordinate value of the corresponding real number coordinate point P are i or greater and i+1 or smaller (i is an integer).

Figure 12:
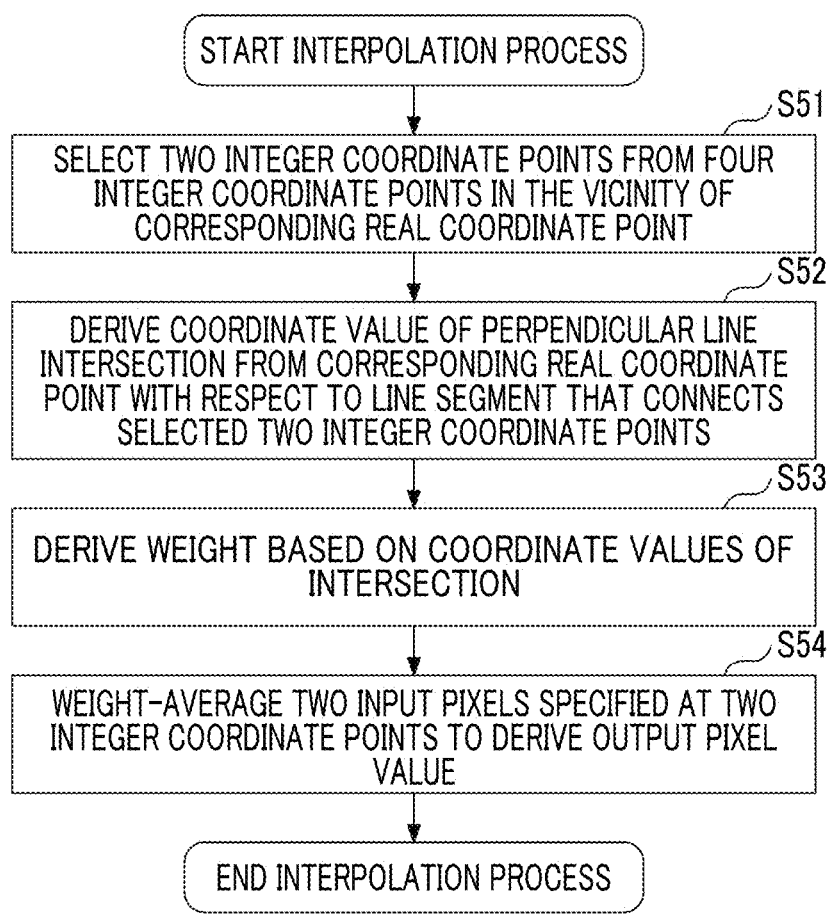
FIG. 12 is a flowchart illustrating a flow of the interpolation process.

Then, a flow of an interpolation process of deriving one output pixel value using two input pixel values by the output image generation unit 11 will be described with reference to FIG. 12. FIG. 12 is a flowchart illustrating the flow of the interpolation process. The output image generation unit 11 executes the interpolation process in step S5 of FIG. 7, for example. Further, in the following flow, a case where the perpendicular line PV is shortest is described, but the same description is also applied to a case where another perpendicular line is shortest.

First, the integer coordinate point selection unit 110 selects two integer coordinate points B and B from four integer coordinate points A to D in the vicinity of the corresponding real number coordinate point P (step S51). Specifically, the integer coordinate point selection unit 110 draws a perpendicular line to each of six line segments AB, AC, AD, BC, BD, and CD from the corresponding real number coordinate point P. Further, the integer coordinate point selection unit 110 selects a perpendicular line PV among six perpendicular lines PQ, PR, PS, PT, PU, and PV, and the line segment BD relating to the perpendicular line PV, and selects two integer coordinate points B and D relating to the line segment BD.

Then, the integer coordinate point selection unit 110 derives a coordinate value of a perpendicular line intersection (real number coordinate point) V of the perpendicular line PV drawn from the corresponding real number coordinate point P with respect to the line segment BD that connects selected two integer coordinate points B and D (step S52).

The integer coordinate point selection unit 110 may select a pair of integer coordinate points using a shortest perpendicular line reference table indicating a correspondence relationship between the position (coordinate values) of the corresponding real number coordinate point P and a shortest perpendicular line. Specifically, the shortest perpendicular line reference table has an arrangement of l rows and m columns (l×m arrangement) and corresponds to an interpolation process when spaces between adjacent integer coordinate points are equally divided into l parts and m parts. l and m are 2 or greater natural numbers, which are preferably a power (for example, 16) of 2 which is optimal for a binary arithmetic operation. Further, l may be equal to m. The integer coordinate point selection unit 110 may uniquely derive the pair of integer coordinate points from the coordinate values of the corresponding real number coordinate point P using the shortest perpendicular line reference table. In addition, the shortest perpendicular line reference table may retain a correspondence relationship between the position (coordinate values) of the corresponding real number coordinate point P and the position (coordinate values) of a perpendicular line intersection. In this case, the integer coordinate point selection unit 110 may uniquely derives the coordinate values of the perpendicular line intersection from the coordinate values of the corresponding real number coordinate point P.

Then, the weight derivation unit 111 reads weights α and β on the basis of coordinate values of the perpendicular line intersection (step S53). Specifically, the weight derivation unit 111 employs a decimal part of the X coordinate value of the perpendicular line intersection as the weight α of a first pixel value specified by the integer coordinate point D. Further, the weight derivation unit 111 employs a decimal part of the Y coordinate value of the perpendicular line intersection as the weight β of a second pixel value specified by the integer coordinate point B.

The weight derivation unit 111 may represent each decimal part of the X coordinate value and the Y coordinate value of the perpendicular line intersection in n steps to be suitable for a binary arithmetic operation. Similarly, the weight derivation unit 111 may represent the weight α having a real number value which is 0 or greater and 1 or less in decimal numbers in n steps. Here, n is a power of 2, and for example, 256. In this case, the integer coordinate point selection unit 110 derives each of decimal parts of the X coordinate value and the Y coordinate value of the perpendicular line intersection in a state of being quantified in 256 steps (8 bits). This is similarly applied to the weight $\alpha$.

FIG. 13 is a diagram illustrating a relationship between a decimal part dx of an X coordinate value and a decimal part dy of a Y coordinate value of a perpendicular line intersection, and a weight $\alpha$ of a first pixel value. Here, dx, dy, and $\alpha$ are integers of decimal numbers in a range of 0 to 255, that is, values capable of being expressed by 8 bits. Further, the value "255" in FIG. 13 is theoretically a value "256", but is used instead of the value "256" in order to express a decimal part of the coordinate value of the perpendicular line intersection by 8 bits.

As shown in FIG. 13, in a case where an integer coordinate point for specifying a first pixel is the integer coordinate point A and an integer coordinate point for specifying a second pixel is the integer coordinate point D, the weight $\alpha$ of the first pixel value is represented as (255−dx). Further, in a case where an integer coordinate point for specifying a first pixel is the integer coordinate point B and an integer coordinate point for specifying a second pixel is the integer coordinate point D, the weight $\alpha$ of the first pixel value is represented as {255−(255−dy+dx)/2}. This is similarly applied to other combinations. Division by a value "2" is realized by one-time right shift operation.

Then, the weight averaging unit 112 weight-averages values of two input pixel values specified by two integer coordinate points to derive an output pixel value (step S54). Specifically, the weight averaging unit 112 derives the output pixel value based on the weight $\alpha$ of the first pixel value. For example, a case where the first pixel has color data (Y1, Cb1, Cr1) of a YCbCr type and the second pixel has color data (Y2, Cb2, Cr2) may be considered. Here, Y1 and Y2 represent luminance signals, and for example, have levels of 256 steps (8 bits). Further, Cb1, Cb2, Cr1, and Cr2 represent color difference signals, and for example, have levels of 256 steps (8 bits). In this case, the luminance signal Y of an output pixel is expressed as Y={$\alpha$×Y1+(255−$\alpha$)×Y2}/256. Further, the color difference signal Cb of the output pixel is expressed as Cb={$\alpha$×Cb1+(255−$\alpha$)×Cb2}/256, and the color difference Cr is expressed as Cr={$\alpha$×Cr1+(255−$\alpha$)×Cr2}/256. The reason why the value "255" is used instead of the value "256" is based on the above description. Further, division based on the value "256" is realized by eight-time right shift operations.

With the above-described configuration, the image generation device 100 weight-averages respective values of two input pixels specified by two integer coordinate points among four integer coordinate points in the vicinity of the corresponding real number coordinate point P. Thus, it is possible to enhance image quality while suppressing an increase in an operation load. For example, the image generation device 100 can enhance the image quality by improving reproducibility of color. Thus, in an output image generated on the basis of an input image captured by the camera 2 mounted on the shovel 60, it is possible to reduce jaggies generated due to vibration of the camera 2 due to a turning operation, a traveling operation, a drilling operation, or the like of the shovel.

Further, according to the interpolation process executed by the image generation device 100, compared with a process of weight-averaging respective values of four input pixels specified by four integer coordinate points in the vicinity of the corresponding real number coordinate point P as in binary interpolation, it is possible to reduce the number of executions of the weight averaging process from three to one, to thereby reduce an operation time. In addition, according to the interpolation process executed by the image generation device 100, it is possible to realize a small amount of computation suitable for embedded mounting based on a field programmable gate array (FPGA) or the like. Thus, in the image generation device 100, it is possible to avoid mounting of a dividing circuit or the like.

Next, a process of preventing the image generation device 100 from making a brightness (luminance) difference between input images noticeable will be described with reference to FIGS. 14 to 19.

FIG. 14 is a diagram illustrating input images of three cameras 2 (a left-side camera 2L, a right-side camera 2R, and a rear camera 2B) mounted on the shovel 60 and an output image generated using the input images.

The image generation device 100 re-projects the respective input images from the three cameras 2 to the processing target image plane R3, in a state of being projected to the plane region R1 and the curved surface region R2 of the space model MD, to generate a processing target image. Further, the image generation device 100 generates an output image by performing an image conversion process (for example, scale conversion, affine conversion, distortion conversion, viewpoint conversion, or the like) with respect to the generated processing target image. In addition, the image generation device 100 simultaneously displays an image (image in the plane region R1) obtained when performing imaging while looking down the vicinity of the shovel 60 from the sky and an image (image in the processing target image plane R3) obtained when performing imaging while viewing the periphery from the shovel 60 in the horizontal direction.

In FIG. 14, an input image of the left-side camera 2L and an input image of the rear camera 2B respectively include overlap portions obtained by imaging the same place around the shovel 60 from different angles. However, the respective overlap portions are imaged at different brightnesses due to a difference between light environments relating to the respective cameras, and thus, have different luminances. This is similarly applied to overlap portions between an input image of the right-side camera 2R and the input image of the rear camera 2B.

Thus, an output image generated on the basis of the three input images gives an unnatural feeling to an operator who views the output image. This is because, in a case where mapping between coordinates on an output image plane and coordinates on plural input image planes is possible, the mapping is performed between the coordinates on the output image plane and coordinates on an input image plane relating to a camera having a minimum incident angle. That is, this is because, although the same place is imaged, the luminance rapidly changes at any place of a boundary (see a region R6 surrounded by a single dot chain line in the figure) between a region on the output image based on the input image of the left-side camera 2L and a region on the output image based on the input image of the rear camera 2B. Similarly, this is because, although the same place is imaged, the luminance rapidly changes at any place of a boundary (see a region R7 surrounded by a single dot chain line in the figure) between a region on the output image based on the input image of the right-side camera 2R and the region on the output image based on the input image of the rear camera 2B.

Thus, the image generation device 100 same-color does not make a luminance difference between input images noticeable using effects due to checker shadow illusion (homochromatic visual illusion).

Figure 15A:
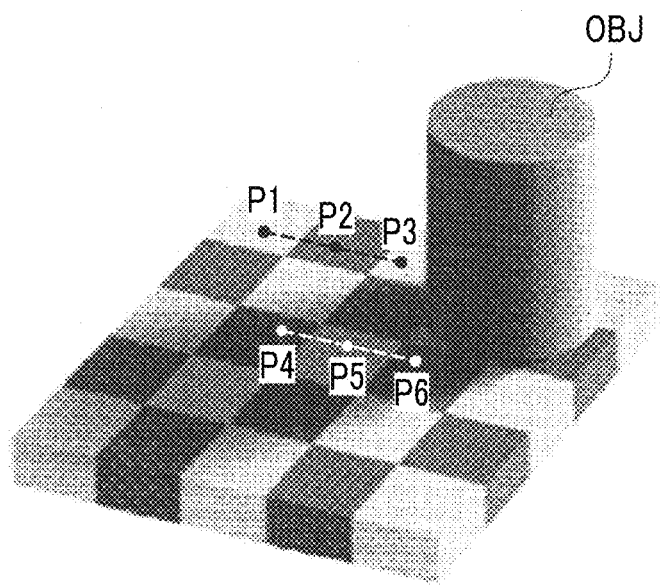
FIG. 15A is a diagram illustrating a homochromatic visual illusion.
Figure 15B:
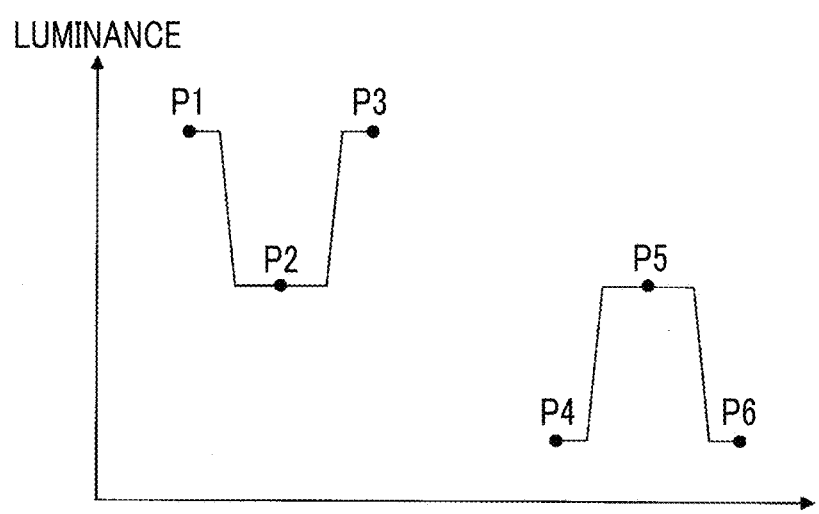
FIG. 15B is a diagram illustrating the homochromatic visual illusion.

FIGS. 15A and 15B are diagrams for describing the homochromatic visual illusion (Edward H. Adelson, "Checker shadow illusion", 1995, Internet <URL: http://web.mit.edu/persci/people/adelson/checkershadow_illusion.html>). Further, FIG. 15A shows a checker pattern (lattice pattern) used for causing the homochromatic visual illusion, and FIG. 15B shows a graph indicating a change in luminance at points P1 to P3 and points P4 to P6 on the checker pattern (lattice pattern).

As shown in FIG. 15A, it seems that the luminance of a unit pattern including the point P2 is lower than the luminance of a unit pattern including the point P5. The unit pattern including the point P2 is interposed between two unit patterns (a unit pattern including the point P1 and a unit pattern including the point P3) having a luminance which is higher than the luminance of the unit pattern including the point P2. Further, the unit pattern including the point P5 is interposed between two unit patterns (a unit pattern including the point P4 and a unit pattern including the point P6) having a luminance which is lower than the luminance of the unit pattern including the point P5.

However, a difference between the luminances is based on a visual illusion of an observer who recognizes that the unit patterns form a lattice pattern and a unit pattern group including the point P4 to P6 is included in a shadow of an object OBJ. Thus, in reality, as shown in FIG. 15B, the luminance of the unit pattern including the point P2 is equal to the luminance of the unit pattern including the point P5.

In this way, the observer misunderstands that three unit patterns that respectively include the point P1, the point P3, and the point P5 have the same luminance and three unit patterns that respectively include the point P2, the point P4, and the point P6 have the same luminance.

Figure 16:
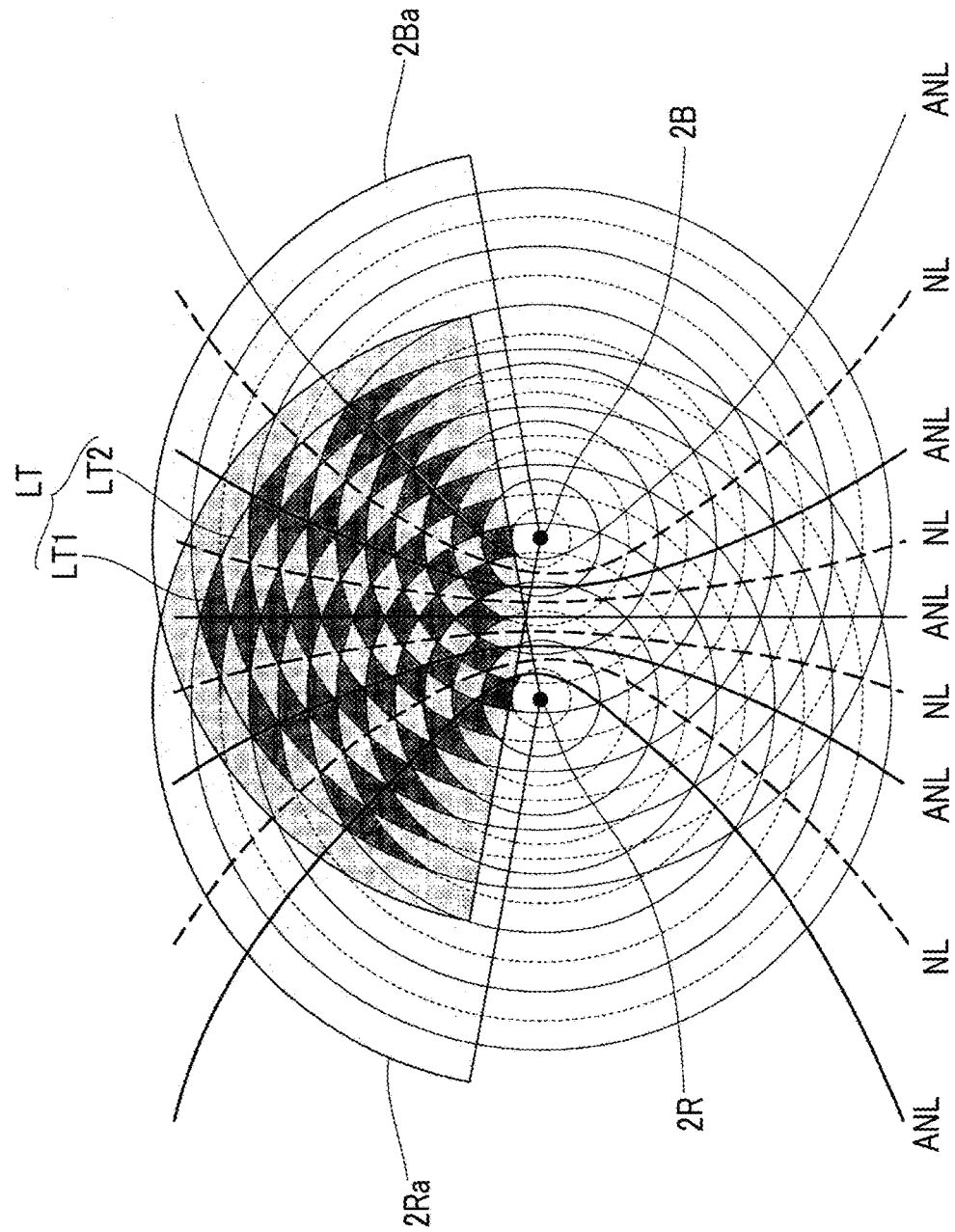
FIG. 16 is a diagram illustrating an example of a method for generating a light and shade pattern that causes the homochromatic visual illusion.

FIG. 16 is a diagram illustrating an example of a method for generating a light and shade pattern that causes the homochromatic visual illusion, and shows two waves that interfere with each other by being spread while forming mountains (solid line circles) and valleys (broken line circles) from two wave sources. The two wave sources are the right-side camera 2R and the rear camera 2B, for example. Further, in FIG. 16, for ease of description, the right-side camera 2R is shown on the left side in the figure, and an upper right side corresponds to the rear side of the shovel 60.

Further, in FIG. 16, two sectorial regions 2Ra and 2Ba indicate an imaging range of the right-side camera 2R and an imaging range of the rear camera 2B, respectively. An abdominal line ANL expressed by a thick solid line indicates a line connecting points at which two waves are strengthened, and a nodal line NL expressed by a thick broken line indicates a line connecting points at which two waves are weakened. The abdominal lines ANL and the nodal lines NL alternately appears as shown in FIG. 16.

Further, in FIG. 16, each of diamond-shaped regions determined by a line (broken line circle) drawn by one valley of the wave that is spread around the right-side camera 2R which is a wave source and a line (solid line circle) drawn by one mountain generated next to the one valley, and a line (broken line circle) drawn by one valley of a wave that is spread around the rear camera 2B which is a wave source, and a line (solid line circle) drawn by one mountain generated next to the one valley forms a unit pattern region LT.

In a case where the plural unit pattern regions LT shown in FIG. 16 is drawn on an output image plane, two input images having different average luminances may form a lattice pattern that causes the homochromatic visual illusion. Here, an input image of the rear camera 2B is associated with a unit pattern region LT1 through which an abdominal line ANL passes (gray color) among the unit pattern regions LT. Further, an input image of the right-side camera 2R is associated with a unit pattern region LT2 through which a nodal line NL passes (white color) among the unit pattern regions LT.

In a case where the input image of the right-side camera 2R is associated with the unit pattern region LT1 through which the abdominal line ANL passes (gray color) among the unit pattern regions LT and the input image of the rear camera 2B is associated with the unit pattern region LT2 through which the nodal line NL passes (white color) among the unit pattern regions LT, similarly, two input images having different average luminances may form a lattice pattern that causes the homochromatic visual illusion.

Further, the lattice pattern in FIG. 16 is formed using two waves of which wavelengths and phases are the same, but may be formed using two waveforms of which one or both of waveforms and phases are different from each other. Thus, it is possible to smoothly adjust the sizes or shapes of the unit pattern regions LT1 and LT2.

Figure 17:
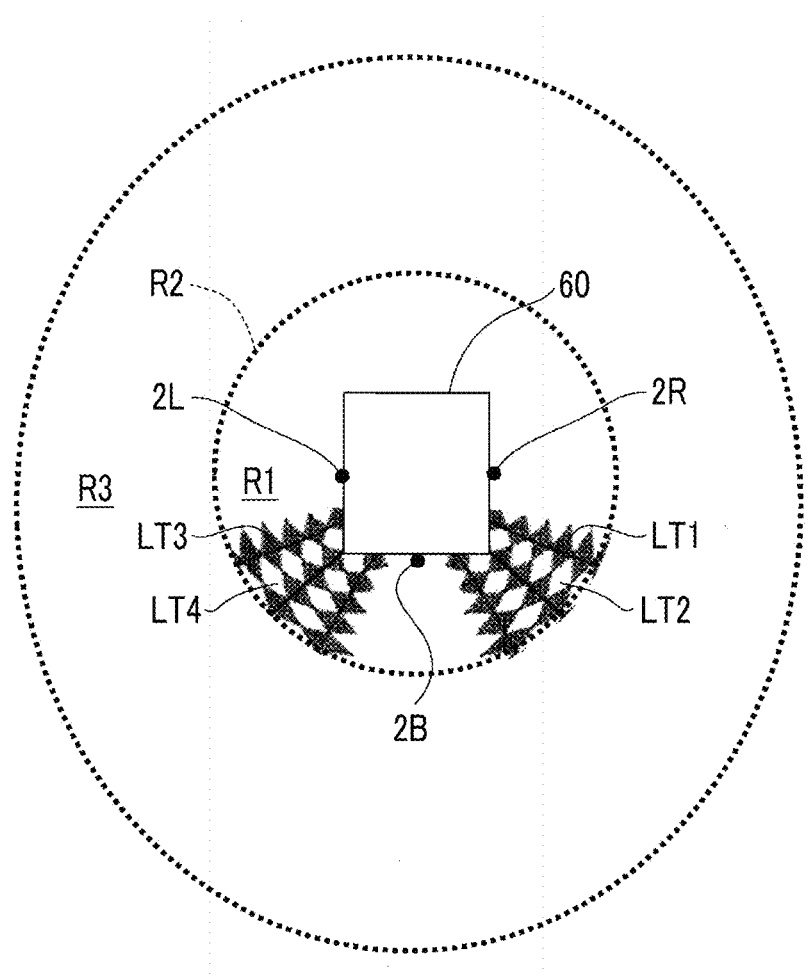
FIG. 17 is a diagram illustrating a state where a lattice pattern shown in FIG. 16 is disposed an output image plane.

FIG. 17 shows a state where the lattice pattern shown in FIG. 16 is disposed on an output image plane (plane region R1), which shows a lattice pattern disposed in an overlap region between an imaging range of the right-side camera 2R and an imaging range of the rear camera 2B, disposed on a rear right side (lower right side in the figure) of a CG image of the shovel 60, and a lattice pattern disposed in an overlap region between an imaging range of the left-side camera 2L and the imaging region of the rear camera 2B, disposed on a rear left side (lower left side in the figure) of a CG image of the shovel 60.

In FIG. 17, in the lattice pattern disposed in the overlap region between the imaging range of the right-side camera 2R and the imaging range of the rear camera 2B, for example, the input image of the right-side camera 2R is associated with the unit pattern region LT1 (gray color) and the image of the rear camera 2B is associated with the unit pattern region LT2 (white color).

Further, in the lattice pattern disposed in the overlap region between the imaging range of the left-side camera 2L and the imaging range of the rear camera 2B, for example, the input image of the left-side camera 2L is associated with a unit pattern region LT3 (gray color) and the image of the rear camera 2B is associated with a unit pattern region LT4 (white color).

Figure 18:
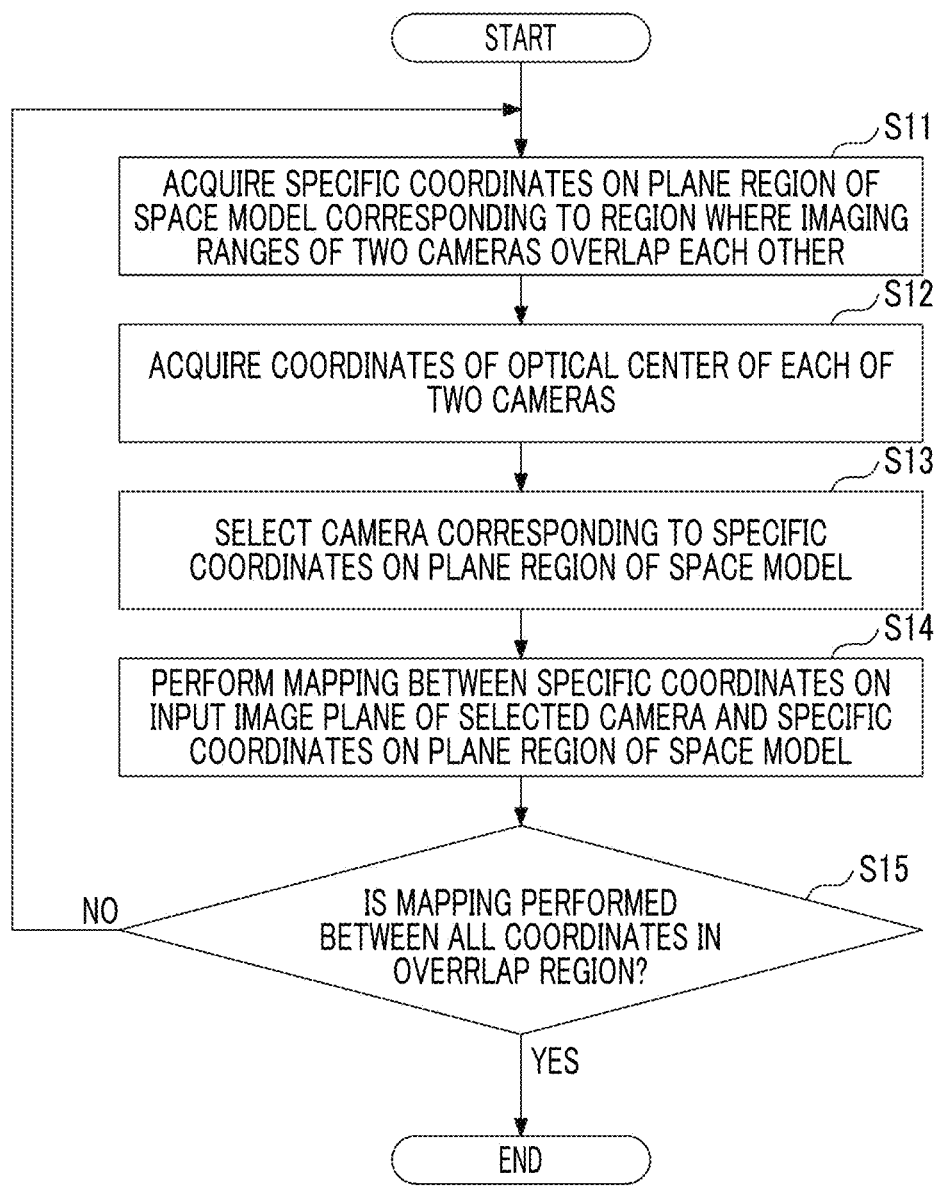
FIG. 18 is a flowchart illustrating a flow of a lattice pattern forming process.

FIG. 18 is a flowchart illustrating a flow of a process of forming a lattice pattern (hereinafter, referred to as a "lattice pattern forming process") for performing mapping between coordinates on an input image plane of any one of two cameras and each set of coordinates on an output image plane corresponding to an overlap region of respective imaging ranges of two cameras to cause the homochromatic visual illusion by the image generation device 100.

In a case where, in step S2 of the processing target image generation process of FIG. 7, mapping between specific coordinates on the plane region R1 of the space point MD and coordinates on plural input image planes is possible by the coordinate mapping unit 10, the control unit 1 of the image generation device 100 executes the lattice pattern forming process. Specifically, when mapping between the specific coordinates on the plane region R1 of the space model MD and specific coordinates on one of two input image planes respectively corresponding to two cameras is performed, the lattice pattern forming process is executed.

First, the control unit 1 acquires specific coordinates on the plane region R1 of the space model MD, corresponding to a region where imaging ranges of two cameras (for example, right-side camera 2R and rear camera 2B) overlap each other (step S11).

Then, the control unit 1 acquires coordinates of an optical center of each of the two cameras (step S12).

Then, the control unit 1 selects a camera corresponding to the specific coordinates on the plane region R1 in the space model MD acquired in step S11 (step S13).

Specifically, the control unit 1 sets the coordinates of the optical center of the right-side camera 2R as $(X_{cam1}, Y_{cam1})$, sets the coordinates of the rear camera 2B as $(X_{cam2}, Y_{cam2})$, and sets the coordinates on the plane region R1 of the space model MD which is a mapping target as $(X_{target}, Y_{target})$. Further, a wavelength of a wave that is spread around the right-side camera 2R which is a wave source is set as $\lambda_1$ [mm], and a phase thereof is set as $P_1$ [rad]. Further, a wavelength of a wave that is spread around the rear camera 2B which is a wave source is set as $\lambda_2$ [mm], and a phase thereof is set as $P_2$ [rad]. Further, in a case where the following conditional expression is true, the control unit 1 selects the right-side camera 2R as a camera corresponding to the specific coordinates on the plane region R1. In a case where the following conditional expression is false, the control unit 1 selects the rear camera 2B as a camera corresponding to the specific coordinates on the plane region R1.

[Expression 12]
$$0 < \sin\left(\frac{\sqrt{(X_{cam1} - X_{target})^2 + (Y_{cam1} - Y_{target})^2}}{\lambda_1} \times 2\pi + P_1\right) \times \sin\left(\frac{\sqrt{(X_{cam2} - X_{target})^2 + (Y_{cam2} - Y_{target})^2}}{\lambda_2} \times 2\pi + P_2\right)$$

Here, in a case where the above conditional expression is true, the control unit 1 may select the rear camera 2B as the camera corresponding to the specific coordinates on the plane region R1. Further, in a case where the conditional expression is false, the control unit 1 may select the right-side camera 2R as the camera corresponding to the specific coordinates on the plane region R1.

The above conditional expression corresponds to a formula for determining whether coordinates (Xtarget, Ytarget) on the plane region R1 are included in the unit pattern region LT1 or in the unit pattern region LT2, shown in FIG. 17.

Further, in this embodiment, the control unit 1 selects a camera based on a two-dimensional distance between specific coordinates (two-dimensional coordinates) on the plane region R1 and coordinates (two-dimensional coordinates projected to a plane including the plane region R1) of each optical center of two cameras, on the assumption that coordinates of an optical center are two-dimensional coordinates and a wave generated from a wave source is a plane wave. However, the control unit 1 may select a camera based on a three-dimensional distance between specific coordinates (three-dimensional coordinates) on the plane region R1 and coordinates (three-dimensional coordinates) of each optical center of two cameras on the assumption that coordinates (including height information) of an optical center are three-dimensional coordinates and a wave generated from a wave source forms a spherical wave.

Further, in this embodiment, the control unit 1 may select a camera corresponding to the specific coordinates on the plane region R1 of the space model MD, corresponding to a region where imaging ranges of two cameras (for example, right-side camera 2R and rear camera 2B) overlap each other. However, the control unit 1 may select a camera corresponding to the specific coordinates on the processing target image plane R3, corresponding to the region where the imaging regions of two cameras overlap each other.

In this embodiment, the control unit 1 may select a camera based on a two-dimensional distance between specific coordinates (two-dimensional coordinates) on the processing target image plane R3 and coordinates (two-dimensional coordinates projected to a plane including the processing target image plane R3) of each optical center of two cameras. Further, the control unit 1 may select a camera based on a three-dimensional distance between specific coordinates (three-dimensional coordinates) on the processing target image plane R3 and coordinates (three-dimensional coordinates) of each optical center of two cameras. The processing target image plane R3 may include the plane region R1.

Then, the control unit 1 performs mapping between specific coordinates on an input image plane of the selected camera and specific coordinates on the plane region R1 of the space model MD by the coordinate mapping unit 10 (step S14). Further, the control unit 1 stores the coordinates on the space model MD, a camera identifier, and the coordinates on the input image plane in the input image-space model correspondence map 40 in association.

Then, the control unit 1 determines whether mapping between all coordinates on the plane region R1 of the space model MD, corresponding to a region where imaging ranges of two cameras overlap each other, and coordinates on an input image plane of one of two cameras is performed (step S15). Further, in a case where it is determined that the mapping is not yet performed with respect to all the coordinates (NO in step S15), the processes of step S11 to step S14 are repeated.

On the other hand, in a case where it is determined that the mapping is performed with respect to all the coordinates (YES in step S15), the control unit 1 terminates the lattice pattern forming process.

Then, in the above description, the control unit 1 performs mapping between each set of coordinates on the plane region R1 of the space model MD or each set of coordinates on the processing target image plane R3, corresponding to the region where the imaging ranges of two cameras overlap each other, and the coordinates on the input image plane of one of two cameras. However, the control unit 1 may perform mapping between each set of coordinates on the curved surface region R2 of the space model MD, corresponding to the region where the imaging ranges of two cameras overlap each other, and the coordinates on the input image plane of one of the two cameras.

In this way, the control unit 1 can easily perform mapping between each set of coordinates on the space model MD and coordinates on an input image plane of one of two cameras using the above-described conditional expression, to thereby generate an appropriate lattice pattern.

Figure 19A:
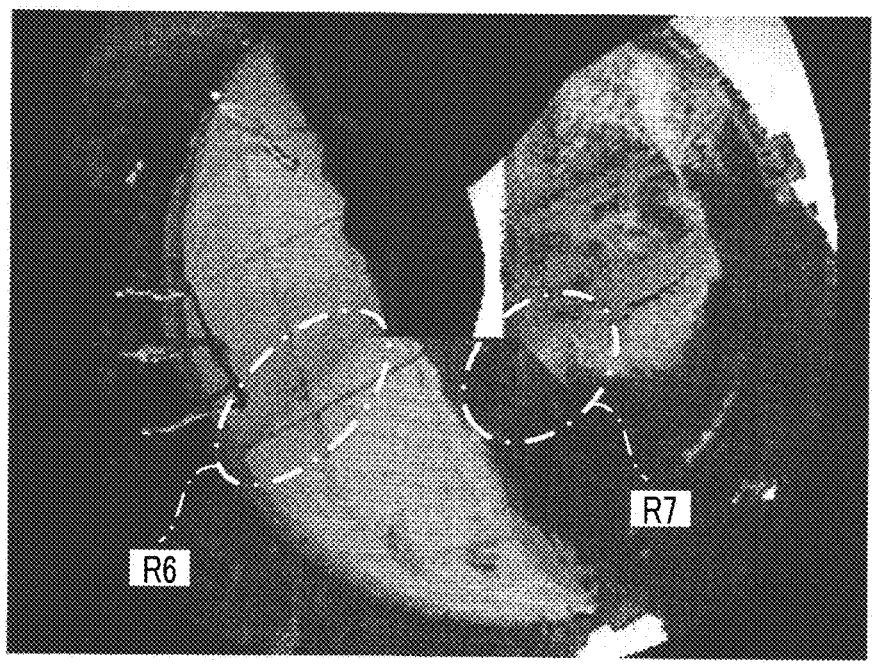
FIG. 19A is a diagram illustrating an output image shown in FIG. 14.
Figure 19B:
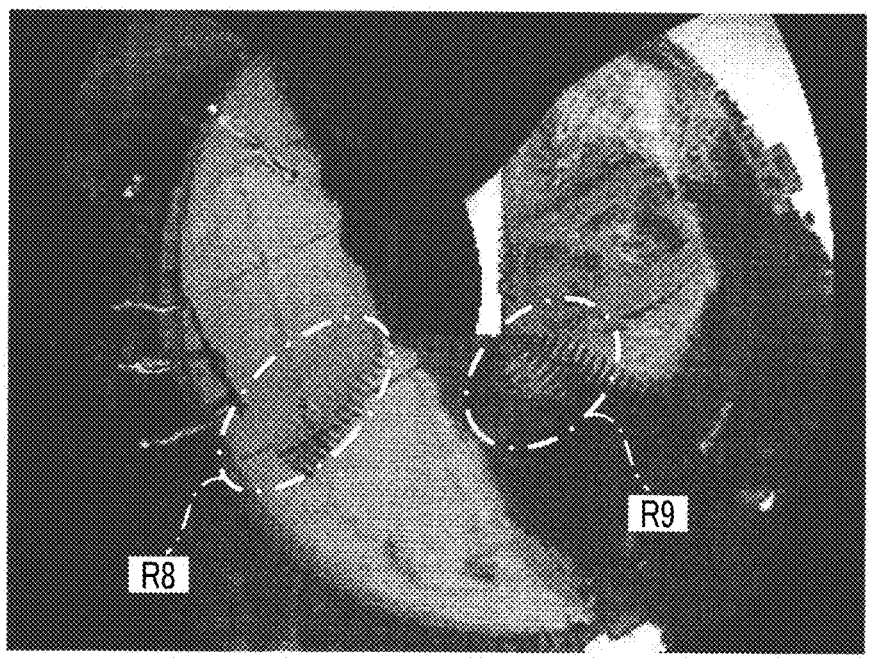
FIG. 19B is a diagram illustrating an output image obtained by applying a lattice pattern that causes a homochromatic visual illusion to the output image shown in FIG. 14.

FIGS. 19A and 19B show a difference between an output image shown in FIG. 14 and an output image obtained by applying a lattice pattern that causes the homochromatic visual illusion to the output image of FIG. 14. FIG. 19A shows the output image shown in FIG. 14, and FIG. 19B shows the output image obtained by applying the lattice pattern that causes the homochromatic visual illusion.

A region R6 surrounded by a single dotted chain line in FIG. 19A including a boundary between a region on an output image based on an input image of the left-side camera 2L and a region on an output image based on an input image of the rear camera 2B shows a noticeable luminance difference. However, a region R8 surrounded by a single dotted chain line in FIG. 19B where a region on an output image based on an input image of the left-side camera 2L and a region on an output image based on an input image of the rear camera 2B are mixed to form a lattice pattern has a small luminance difference. Thus, the image generation device 100 does not easily give an unnatural feeling to an operator who views an output image including the region R8.

Similarly, a region R7 surrounded by a single dotted chain line in FIG. 19A including a boundary between a region on an output image based on an input image of the right-side camera 2R and a region on an output image based on an input image of the rear camera 2B shows a noticeable luminance difference. However, a region R9 surrounded by a single dotted chain line in FIG. 19B where a region on an output image based on an input image of the right-side camera 2R and a region on an output image based on an input image of the rear camera 2B are mixed to form a lattice pattern has a small luminance difference. Thus, the image generation device 100 does not easily give an unnatural feeling to an operator who views an output image including the region R9.

Next, a process of preventing, when the image generation device 100 generates an output image portion corresponding to an overlap region of respective imaging ranges of two cameras, an object disposed in the output image portion from being lost will be described with reference to FIGS. 20 to 22.

Figure 20:
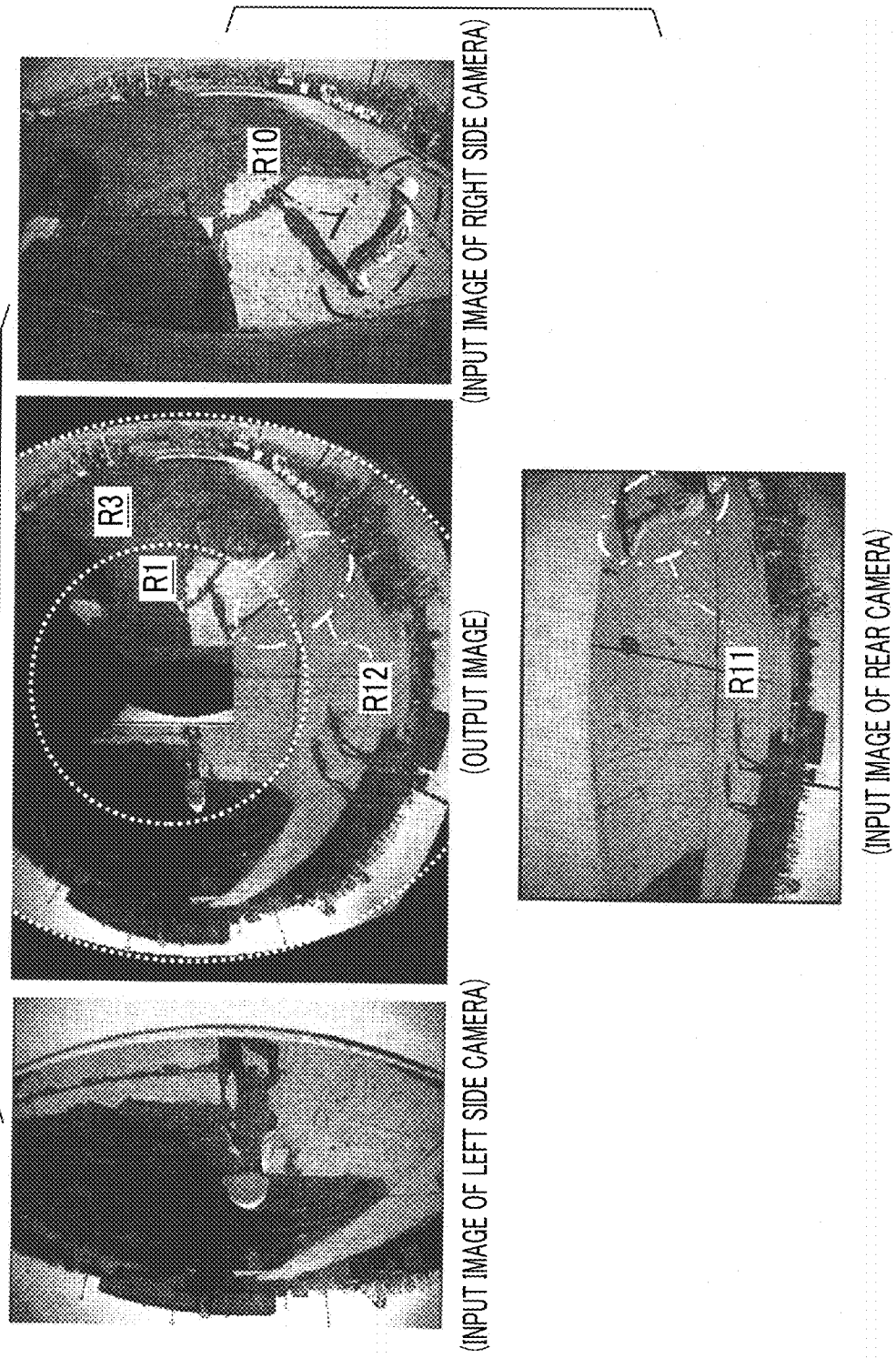
FIG. 20 shows still another display example of an output image.

FIG. 20 is a diagram illustrating input images of three cameras 2 (left-side camera 2L, right-side camera 2R, and rear camera 2B) mounted on the shovel 60, and an output image generated using the input images.

The image generation device 100 re-projects coordinates on an input image plane from each of the three cameras 2 to the processing target image plane R3, in a state of being projected to coordinates on the plane region R1 and coordinates on the curved surface region R2 in the space model MD, to generate a processing target image. Further, the image generation device 100 generates an output image by performing an image conversion process (for example, scale conversion, affine conversion, distortion conversion, viewpoint conversion, or the like) with respect to the generated processing target image. In addition, the image generation device 100 displays an image (image in the plane region R1) obtained when performing imaging while looking down the vicinity of the shovel 60 from the sky and an image (image in the processing target image plane R3) obtained when performing imaging while viewing the periphery from the shovel 60 in the horizontal direction.

In FIG. 20, an input image of the right-side camera 2R and an input image of the rear camera 2B respectively include a person (see a region R10 surrounded by a double dot chain line in the input image of the right-side camera 2R and a region R11 surrounded by a double dot chain line in the input image of the rear camera 2B) within an overlap region between an imaging range of the right-side camera 2R and an imaging range of the rear camera 2B.

However, an output image generated based on the input image of the right-side camera 2R and the input image of the rear camera 2B shows a state where mapping is performed between coordinates on an output image plane and coordinates on an input image plane relating to a camera having the smallest incident angle. Thus, as shown in FIG. 20, a person in the overlap region is lost (see a region R12 surrounded by a single dotted chain line in the output image).

Thus, when generating an output image portion corresponding to an overlap region of respective imaging ranges of two cameras using a lattice pattern formed for causing the homochromatic visual illusion, the image generation device 100 prevents an object disposed in the output image portion from being lost.

Figure 21A:
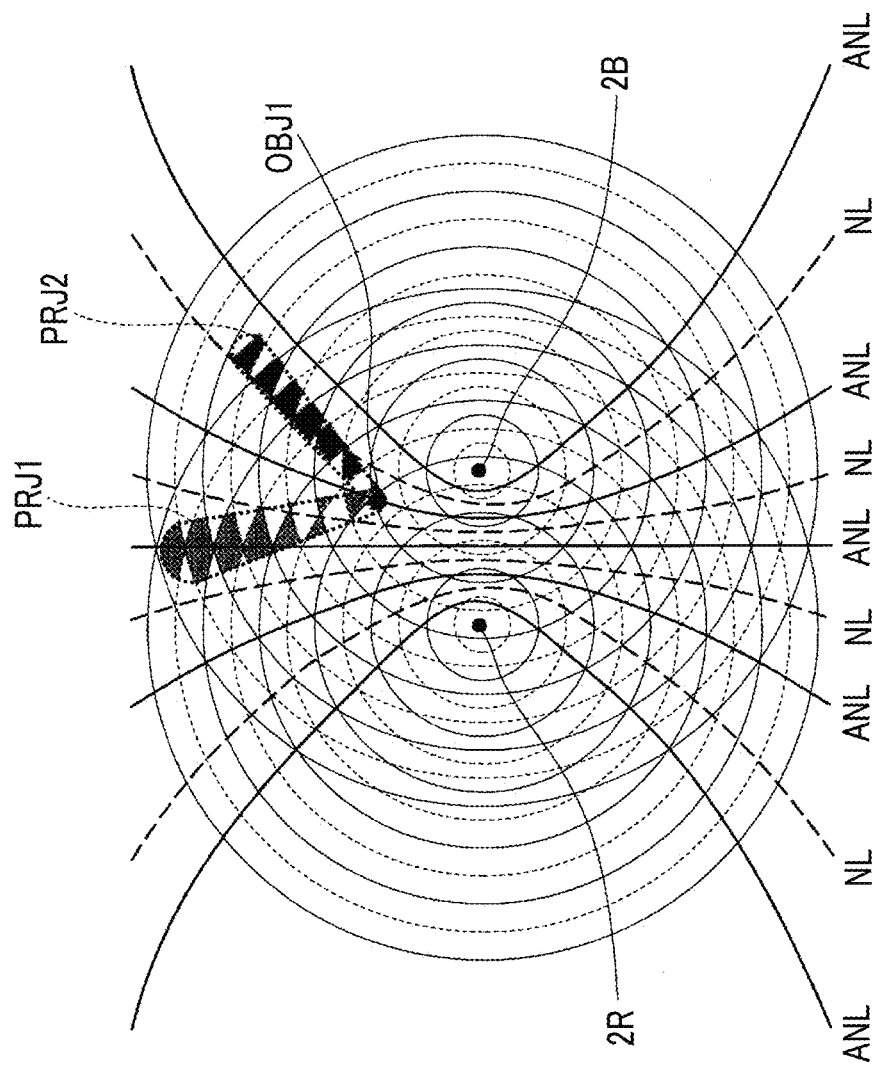
FIG. 21A is a diagram illustrating a loss prevention effect of an object in an overlap region in respective imaging ranges of two cameras.
Figure 21B:
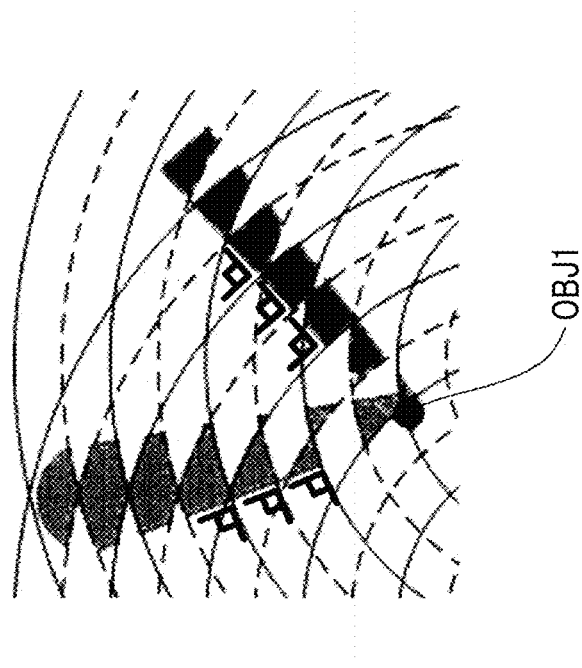
FIG. 21B is a partially enlarged view of FIG. 21A.

FIGS. 21A and 21B are diagrams illustrating a loss prevention effect for an object in an overlap region in respective imaging ranges of two cameras. FIG. 21A shows a diagram illustrating a wave for forming a lattice pattern for causing the homochromatic visual illusion shown in FIG. 16, and FIG. 21B shows a partially enlarged view of FIG. 21A.

In FIG. 21A, a projection image PRJ1 surrounded by a broken line indicates that an image of an object OBJ1 in an input image of the rear camera 2B is an image that extends in an extension direction of a line that connects the rear camera 2B to the object OBJ1 through viewpoint conversion for generating a road surface image (an image displayed in a case where the road surface image in the output image portion is generated using the input image of the rear camera 2B).

Further, a projection image PRJ2 surrounded by a broken line indicates that an image of an object OBJ1 in an input image of the right-side camera 2R is an image that extends in an extension direction of a line that connects the right-side camera 2R to the object OBJ1 through viewpoint conversion for generating a road surface image (an image displayed in a case where the road surface image in the output image portion is generated using the input image of the right-side camera 2R).

The projection image PRJ1 and the projection image PRJ2 are displayed in a state where a part thereof is cut as shown in FIG. 21B, instead of being displayed on a final output image as they are.

Further, in FIG. 21A, a gray color portion in the broken line region indicating the projection image PRJ1 indicates an overlap portion with respect to the unit pattern region LT1 (see FIG. 16) through which an abdominal line ANL passes. Further, mapping is performed between coordinates on an input image plane of the rear camera 2B (coordinates in a region where the image of the object OBJ1 is formed) and each set of coordinates on an output image corresponding to the overlap portion.

On the other hand, a white color portion in the broken line region indicating the projection image PRJ1 indicates an overlap portion with respect to the unit pattern region LT2 (see FIG. 16) through which a nodal line NL passes. Further, mapping is performed between coordinates on an input image plane of the right-side camera 2R (coordinates in a region where the image of the object OBJ1 is not formed) and each set of coordinates on an output image corresponding to the overlap portion.

Here, mapping may be performed between coordinates on the input image plane of the right-side camera 2R (coordinates in a region where the image of the object OBJ1 is not formed) and each set of coordinates on the output image corresponding to the gray color portion in the broken line region indicating the projection image PRJ1. Further, mapping is performed between coordinates on an input image plane of the rear camera 2B (coordinates in a region where the image of the object OBJ1 is formed) and each set of coordinates on an output image corresponding to a white color portion in the broken line region indicating the projection image PRJ1.

In this case, the projection image PRJ1 is cut by the unit pattern region LT2 including a part of each of circles perpendicular to its extension direction (circles drawn by mountains and valleys of a wave when the position of the rear camera 2B is a wave source) as its boundary line, as shown in FIG. 21B. However, since adjacent unit pattern regions LT1 are in contact with each other at their apexes and are not easily separated into small pieces and each of the unit pattern regions LT2 includes a part of each circle perpendicular to its extension direction, the projection image PRJ1 is stored in a state where its contour is easily recognizable.

Further, there is a tendency that the projection image PRJ1 extends to be longer in a direction going away from the camera as the height of the object OBJ1 becomes higher and is more greatly enlarged as the distance from the camera becomes longer. However, since both of the unit pattern regions LT1 and LT2 are more greatly enlarged as the distance from the camera becomes longer, at the same degree as that of the projection image PRJ1, their cut states are also approximately uniformly maintained.

In FIG. 21A, a black color portion in the broken line region indicating the projection image PRJ2 indicates an overlap portion with respect to the unit pattern region LT2 (see FIG. 16) through which the nodal line NL passes. Further, mapping is performed between coordinates (coordinates in a region where the image of the object OBJ1 is formed) on the input image plane of the right-side camera 2R and each set of coordinates on an output image corresponding to the overlap portion.

On the other hand, a white color portion in the broken line region indicating the projection image PRJ2 indicates an overlap portion with respect to the unit pattern region LT1 (see FIG. 16) through which the abdominal line ANL passes. Further, mapping is performed between coordinates (coordinates in a region where the image of the object OBJ1 is not formed) on an input image plane of the rear camera 2B and each set of coordinates on an output image corresponding to the overlap portion.

Mapping may be performed between coordinates (coordinates in a region where the image of the object OBJ1 is not formed) on an input image plane of the rear camera 2B and each set of coordinates on an output image corresponding to the black color portion in the broken line region indicating the projection image PRJ2. Further, mapping may be performed between coordinates (coordinates in a region where the image of the object OBJ1 is formed) on an input image plane of the right-side camera 2R and each set of coordinates on an output image corresponding to the white color portion in the broken line region indicating the projection image PRJ2.

In this case, the projection image PRJ2 is cut by the unit pattern region LT1 including a part of each of circles perpendicular to its extension direction (circles drawn by mountains and valleys of a wave when the position of the right-side camera 2R is a wave source) as its boundary line, as shown in FIG. 21B, similar to the projection image PRJ1. However, since adjacent unit pattern regions LT2 are in contact with each other at their apexes and are not easily separated into small pieces and each of the unit pattern regions LT1 includes a part of each circle perpendicular to its extension direction, the projection image PRJ2 is stored in a state where its contour is easily recognizable.

Further, there is a tendency that the projection image PRJ2 extends to be longer in a direction going away from the camera as the height of the object OBJ1 becomes higher and is more greatly enlarged as the distance from the camera becomes longer, similar to the projection image PRJ1. However, since both of the unit pattern regions LT1 and LT2 are more greatly enlarged as the distance from the camera becomes longer, at the same degree as that of the projection image PRJ2, their cut states are also approximately uniformly maintained.

Figure 22A:
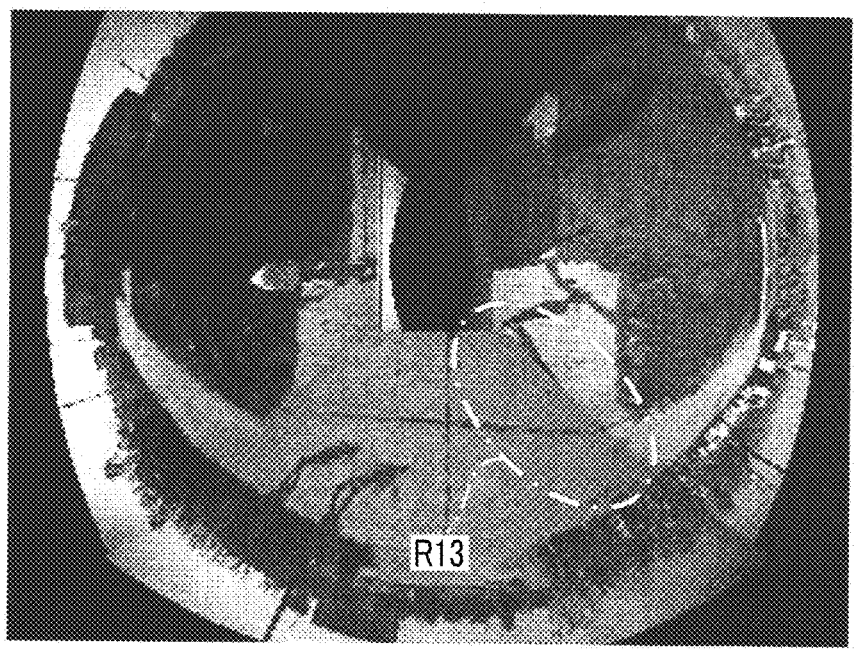
FIG. 22A is a diagram illustrating an output image shown in FIG. 20.
Figure 22B:
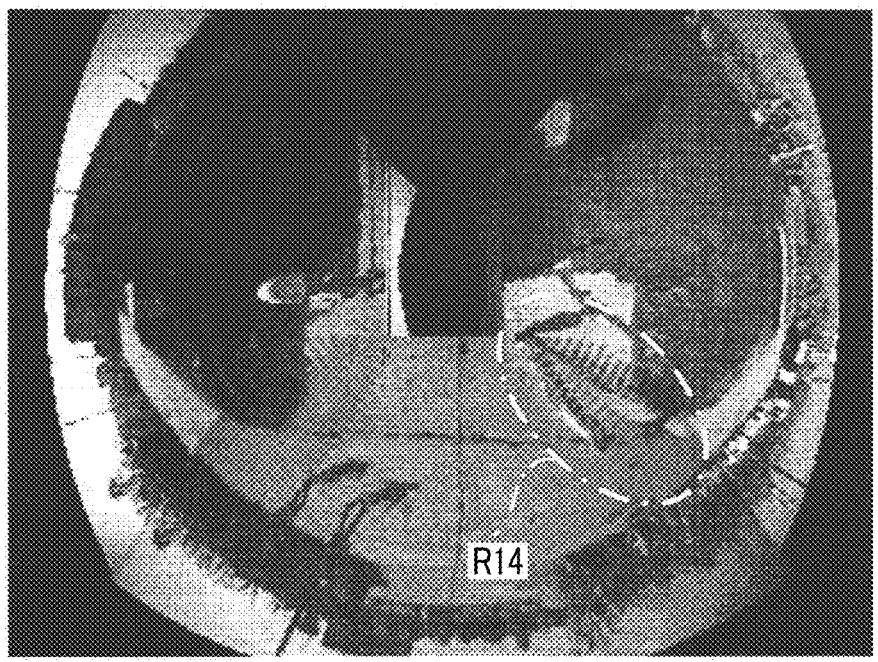
FIG. 22B is an output image obtained by applying a lattice pattern that causes a homochromatic visual illusion to the output image shown in FIG. 20.

FIGS. 22A and 22B show a difference between an output image shown in FIG. 20 and an output image obtained by applying a lattice pattern that causes the homochromatic visual illusion to the output image of FIG. 20. FIG. 22A shows the output image shown in FIG. 20, and FIG. 22B shows the output image obtained by applying the lattice pattern that causes the homochromatic visual illusion.

A region R13 surrounded by a single dotted chain line in FIG. 22A including a boundary between a region on an output image based on an input image of the right-side camera 2R and a region on an output image based on an input image of the rear camera 2B shows a state where a person is lost. However, a region R14 surrounded by a single dotted chain line in FIG. 22B where a region on an output image based on an input image of the right-side camera 2R and a region on an output image based on an input image of the rear camera 2B are mixed to form a lattice pattern shows a state where a person is easily recognizable without being lost. Thus, the image generation device 100 can cause an operator who views an output image including the region R14 to reliably recognize the presence of the person.

With such a configuration, the image generation device 100 can prevent an object disposed in an output image portion from being lost when the output image portion corresponds to a region where imaging ranges of two cameras overlap each other by using a lattice pattern that causes the homochromatic visual illusion. Further, the image generation device 100 can store a contour of a projection image of an object disposed in the output image portion corresponding to the overlap portion in a form of being easily visually recognizable, and can display a projection image of an object of which a part thereof is cut in a state where an operator can easily recognize the projection image, compared with a case where two input images are combined so that respective portion regions of two input images are alternately arranged in a comb tooth shape.

However, the image generation device 100 should accept deterioration of an appearance due to fragmentation of a projection image as long as a lattice pattern is used. Particularly, in a case where the resolution of an output image is low, details of the unit pattern regions Lt1 and LT2 deteriorate, and thus, deterioration of an appearance due to noise generation or the like becomes noticeable. As a result, there may be a case where it is not possible to achieve an original design intention for storing a contour of a projection image in a form of being easily visually recognizable.

In a case where values of pixels in an input image of the rear camera 2B and values of pixels in an input image of the right-side camera 2R are averaged when an output image portion corresponding to an overlap region is generated without using a lattice pattern, the control unit 1 can prevent deterioration of an appearance due to fragmentation of a projection image. However, since the projection image becomes translucent, visibility of the projection image deteriorates. Further, if a lattice pattern is not used, since it is not possible to realize the above-mentioned effect due to the lattice pattern, it is not possible to employ such an averaging process as it is.

Thus, in order to prevent deterioration of an appearance while maintaining visibility of a projection image, the control unit 1 of the image generation device 100 adjusts values of pixels in details of each of the unit pattern regions LT1 and LT2. Specifically, the control unit 1 weight-averages values of pixels in an input image of the rear camera 2B and values of pixels in an input image of the right-side camera 2R to derive values of pixels that form the unit pattern regions LT1 and LT2. In this embodiment, the control unit 1 may derive a weighted average between the values of the pixels in the input image of the rear camera 2B and the values of the pixels in the input image of the right-side camera 2R using the weight averaging unit 112 used in an interpolation process. With such a configuration, the control unit 1 can prevent deterioration of an appearance while maintaining visibility of an output image portion using both of a lattice pattern and averaging. Here, enhancement of the visibility due to the lattice pattern and enhancement of the appearance due to the averaging are in a trade-off relationship. Specifically, when a weighted average value employed as a value of each pixel becomes close to a simple average value, the appearance is enhanced, but the visibility deteriorates. This is because fragmentation due to the lattice pattern is canceled, but the projection image becomes translucent. Thus, as described later, the control unit 1 achieves balance of visibility and appearance by appropriately adjusting a weight coefficient used in weight averaging according to the position of each pixel.

Figure 23:
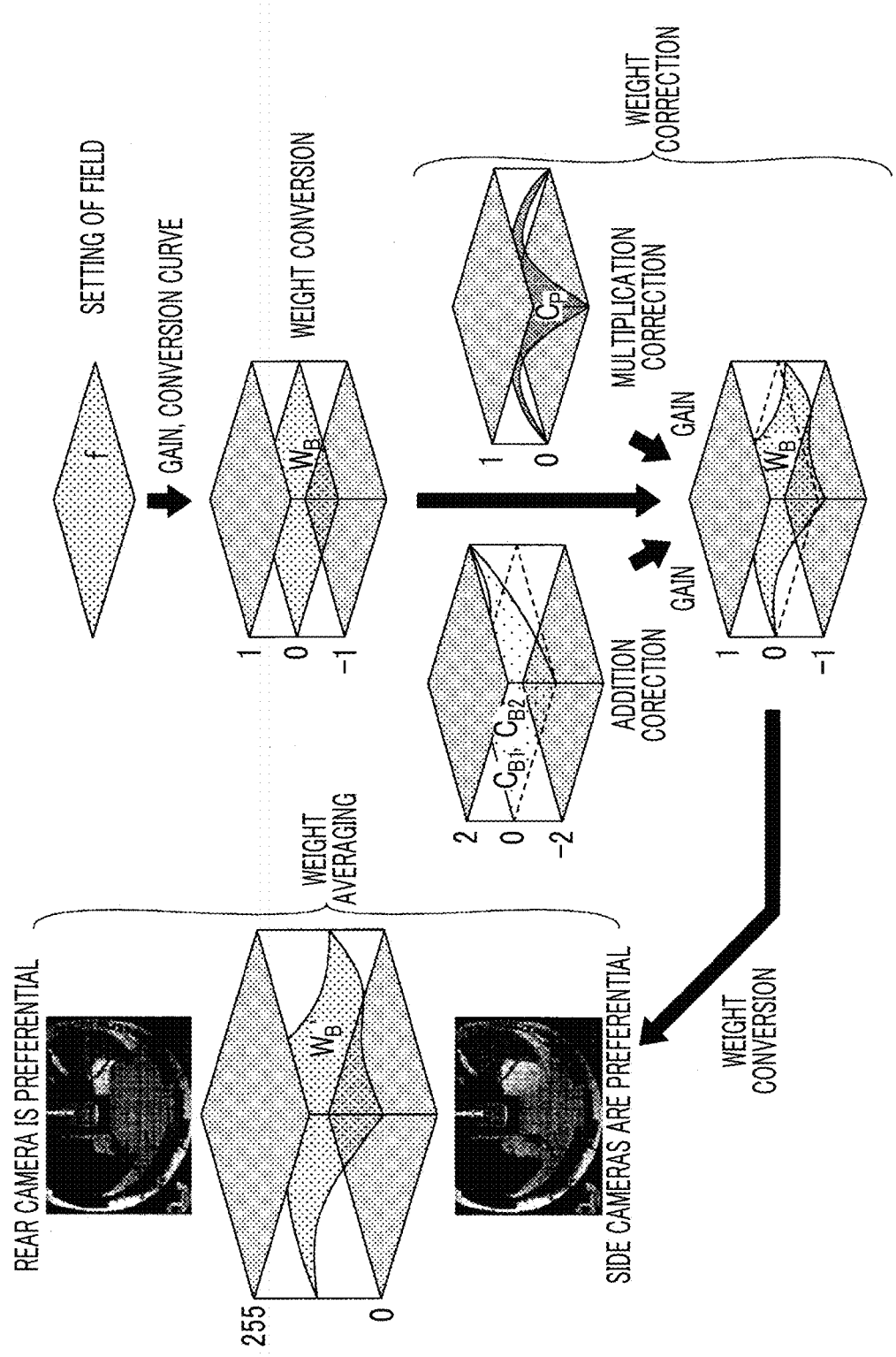
FIG. 23 is a diagram schematically illustrating a flow of an averaging boundary process.

FIG. 23 is a diagram schematically illustrating a flow of a process (hereinafter, referred to as an "averaging boundary process") of weight-averaging values of pixels in an input image of the rear camera 2B and values of pixels in an input images of the side cameras 2L and 2R by the control unit 1 in order to enhance an appearance of an output image portion corresponding to an overlap portion. Hereinafter, for ease of description, a case where the values of the pixels in the input image of the rear camera 2B and the values of the pixels in the input image of the right camera 2R are weight-averaged will be described. However, the same description may be applied to a case where the values of the pixels in the input image of the rear camera 2B and the values of the pixels in the input image of the left-side camera 2L are weight-averaged.

First, the control unit 1 sets a "field" on an output image plane. Here, the "field" (which will be described later) refers to a physical quantity relating to each point of space-time (on the output image plane). In the "field", if coordinates are designated, a single specific physical quantity is determined.

$$\sin\left(\frac{\sqrt{(X_{cam1} - X_{target})^2 + (Y_{cam1} - Y_{target})^2}}{\lambda_1} \times 2\pi + P_1\right) \times$$
$$\sin\left(\frac{\sqrt{(X_{cam2} - X_{target})^2 + (Y_{cam2} - Y_{target})^2}}{\lambda_2} \times 2\pi + P_2\right)$$
[Expression 13]

Expression (13) is an example of the "field", and represents a physical quantity relating to amplitude of a composite wave of a wave when the position of the right-side camera 2R is a wave source and a wave when the position of the rear camera 2B is a wave source. $(X_{cam1}, Y_{cam1})$ indicates coordinates of an optical center of the right-side camera 2R, $(X_{cam2}, Y_{cam2})$ indicates coordinates of an optical center of the rear camera 2B, and $(X_{target}, Y_{target})$ indicates specific coordinates on the plane region R1 of the space model MD. Further, $\lambda_1$ indicates a wavelength [mm] of a wave which is spread around the right-side camera 2R which is a wave source, P1 indicates a phase thereof [rad] of a wave that is spread around the right-side camera 2R which is a wave source, $\lambda_2$ indicates a wavelength [mm] of a wave that is spread around the rear camera 2B which is a wave source, and P2 indicates a phase thereof [rad] of a wave which is spread around the rear camera 2B which is a wave source.

In this embodiment, the control unit 1 sets the field expressed by the above-described expression. In this case, a value f of the "field" is expressed by $-1 \leq f \leq 1$. Further, the value f of the "field" in the unit pattern region LT1 shown in FIG. 17 is expressed by $0 < f \leq 1$, and the value f of the "field" in the unit pattern region LT2 is expressed by $-1 \leq f \leq 0$.

Further, the control unit 1 may set Expression (14) which represents the physical quantity relating to the amplitude of the composite wave of the wave when the position of the right-side camera 2R is the wave source and the wave when the position of the rear camera 2B is the wave source as the "field".

$$\frac{\left(\sin\left(\frac{\sqrt{(X_{cam1} - X_{target})^2 + (Y_{cam1} - Y_{target})^2}}{\lambda_1} \times 2\pi + P_1\right) + \sin\left(\frac{\sqrt{(X_{cam2} - X_{target})^2 + (Y_{cam2} - Y_{target})^2}}{\lambda_2} \times 2\pi + P_2\right)\right)}{2}$$
[Expression 14]

In this case, the value f of the "field" is expressed by $-1 \leq f \leq 1$. Further, the value f of the "field" in the unit pattern region LT1 shown in FIG. 17 is expressed by $0 < f \leq 1$, and the value f of the "field" in the unit pattern region LT2 is expressed by $-1 \leq f \leq 0$.

Then, the control unit 1 converts the value f of the "field" into a "weight" value w. The "weight" refers to a weight coefficient used in weight averaging. In this embodiment, the control unit 1 converts the value of the "field" into a "weight" value $w_B$ of a pixel value in an input image of the rear camera 2B. Further, the value $w_B$ is in a complementary relationship with a "weight" value $w_R$ of a pixel value in an input image of the right-side camera 2R. The sum of the value $w_B$ and the value $w_R$ is constantly uniform, and thus, if the value $w_B$ increases, the value $w_R$ decreases.

Figure 24:
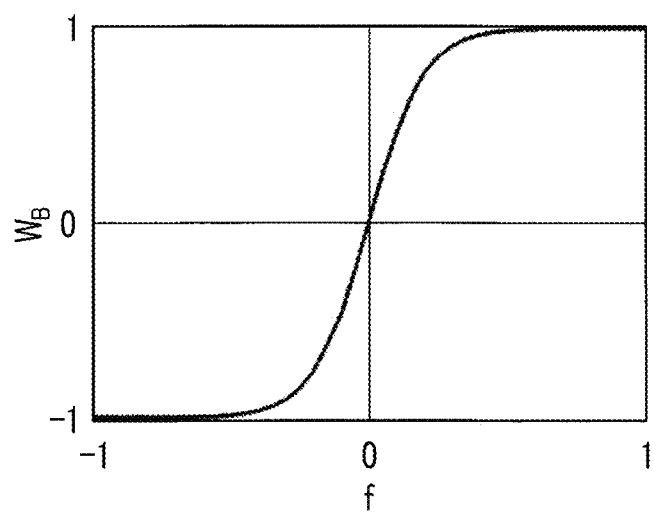
FIG. 24 is an example of a conversion curve used in conversion from a "field" value to a "weight" value.

FIG. 24 shows an example of a conversion curve used for conversion from the value f of the "field" to the "weight" value $w_B$. The conversion curve of FIG. 24 is expressed by Expression (15).

$$w_B = 2 \times \left\{ \frac{1}{1+\exp\left(\frac{-f}{A_0}\right)} - 0.5 \right\} \quad \text{[Expression 15]}$$

For example, this conversion curve is used in enhancing contrast of a lattice pattern in an output image portion corresponding to an overlap portion. Here, $A_0$ represents a parameter indicating rapid steepness, and for example, $0 < A_0 \leq 0.12$.

Figure 25:
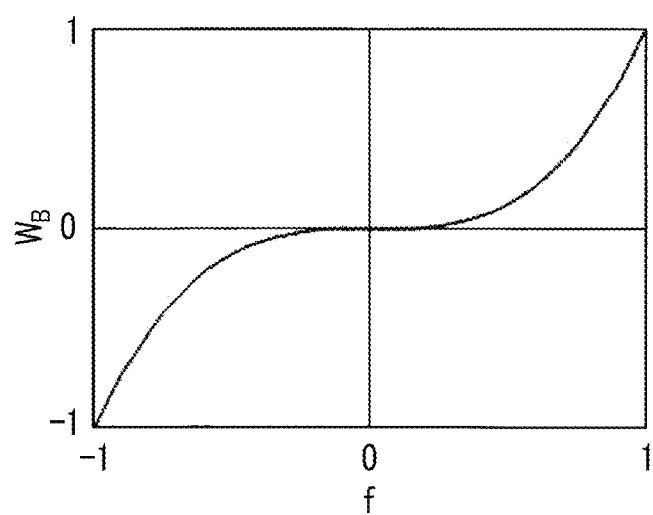
FIG. 25 is another example of a conversion curve used in conversion from a "field" value to a "weight" value.

FIG. 25 is another example of a conversion curve used in conversion from the value f of the "field" to the "weight" value $w_B$. The conversion curve of FIG. 25 is expressed by $w = A_1 F^3 + (1 - A_1) f$, and for example, is used when weakening contrast of a lattice pattern in an output image portion corresponding to an overlap portion. Here, $A_1$ represents a parameter indicating rapid steepness, and for example, $0 < A_1 \leq 1$ and becomes linear when $A_1$ is 0.

Further, in the current step, the "weight" value $w_B$ is converted to become a value which is −1 or greater and +1 or less. Thus, the converted value is conveniently used in subsequent processes. This conversion uses rounding-off (limited to a minimum value and a maximum value), a scale conversion (linear conversion), or the like.

Further, in a case where the "field" and the conversion curve as described above are used, a value of a pixel in the unit pattern region LT1 is derived in a state where the weight $w_B$ of the pixel value in the input image of the rear camera 2B is equal to or greater than the weight $w_R$ of the pixel value in the input image of the right-side camera 2R. That is, the value of the pixel in the unit pattern region LT1 is derived so that the influence (contribution degree) of the pixel value in the input image of the rear camera 2B is equal to or greater than the influence (contribution degree) of the pixel value in the input image of the right-side camera 2R. Further, a value of a pixel in the unit pattern region LT2 is derived in a state where the weight $w_R$ of the pixel value in the input image of the right-side camera 2R is equal to or greater than the weight $w_R$ of the pixel value in the input image of the rear camera 2B. That is, the value of the pixel in the unit pattern region LT2 is derived so that the influence (contribution degree) of the pixel value in the input image of the right-side camera 2R is equal to or greater than the influence (contribution degree) of the pixel value in the input image of the rear camera 2B.

Here, with respect to the pixel in the unit pattern region LT1, the derivation may be performed in a state where the weight $w_R$ is equal to or greater than the weight $w_B$, and with respect to the pixel in the unit pattern region LT2, the derivation may be performed in a state where the weight $w_B$ is equal to or greater than the weight $w_R$. Further, each of the weights $w_B$ and $w_R$ relating to the pixels in the unit pattern region LT1 may have different values or the same value for respective pixels. This is similarly applied to the weights $w_B$ and $w_R$ relating to the pixels in the unit pattern region LT2.

Further, it is not necessary that the weights $w_B$ relating to all pixels in the unit pattern region LT1 are equal to or greater than the weights $w_R$, and that the weights $w_R$ relating to all pixels in the unit pattern region LT2 are equal to or greater than the weights $w_B$. For example, the weights $w_B$ and $w_R$ may be derived using a conversion curve such that an average value of the weights $w_B$ relating to the respective pixels in the unit pattern region LT1 is equal to or greater than an average value of the weights $w_R$, and an average value of the weights $w_R$ relating to the respective pixels in the unit pattern region LT2 is equal to or greater than an average value of the weights $w_B$. This is similarly applied to a case where the weight $w_R$ relating to the pixels in the unit pattern region LT1 is derived in a state of being equal to or greater than the weight $w_B$, and a case where the weight $w_B$ relating to the pixels in the unit pattern region LT2 is derived in a state of being equal to or greater than the weight $w_R$.

Figure 26A:
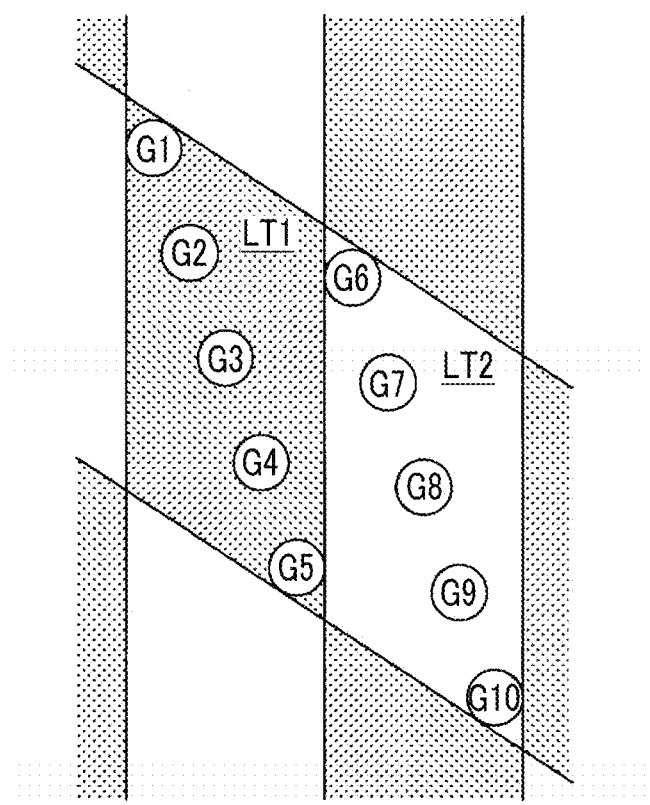
FIG. 26A is a diagram illustrating an arrangement of pixels in each of two types of unit pattern region.
Figure 26B:
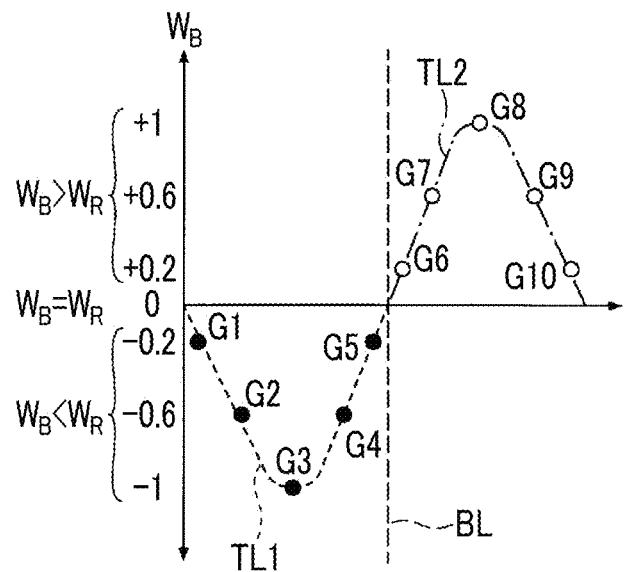
FIG. 26B is a diagram illustrating a value of a weight $w_B$ relating to each pixel in FIG. 26A.
Figure 26C:
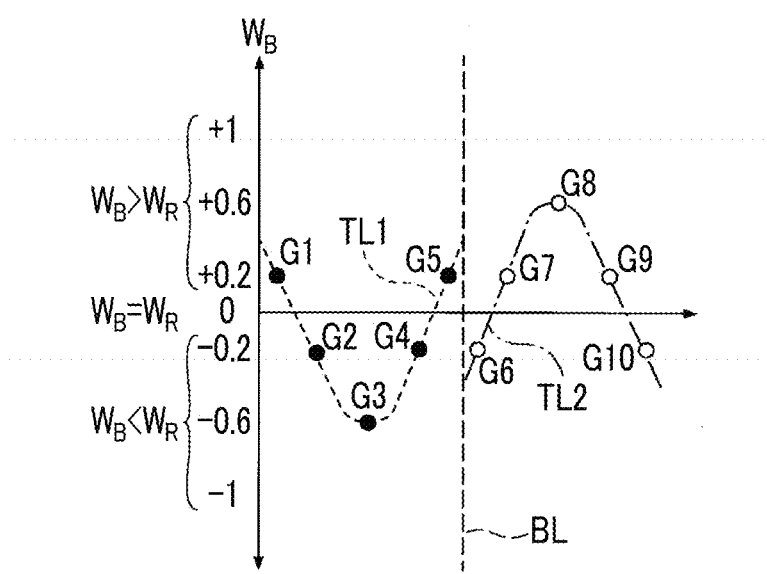
FIG. 26C is a diagram illustrating the value of the weight $w_B$ relating to each pixel in FIG. 26A.

FIGS. 26A to 26C are diagrams illustrating a relationship between values of weights $w_B$ relating to pixels in the unit pattern region LT1 and values of weights $w_B$ relating to pixels in the unit pattern region LT2. Specifically, FIG. 26A shows an arrangement of respective pixels in the unit pattern regions LT1 and LT2. Here, the unit pattern region LT1 includes pixels G1 to G5, and the unit pattern region LT2 includes pixels G6 to G10. In this embodiment, pixels G1 and G5 are pixels disposed in peripheral portions of the unit pattern region LT1, the pixel G3 is a pixel disposed in a central portion of the unit pattern region LT1, and pixels G2 and G4 are pixels disposed in a middle portion between the central portion and the peripheral portions of the unit pattern region LT1.

Similarly, the pixels G6 and G10 are pixels disposed in peripheral portions of the unit pattern region LT2, the pixel G8 is a pixel disposed in a central portion of the unit pattern region LT2, and pixels G7 and G9 are pixels disposed in a middle portion between the central portion and the peripheral portions of the unit pattern region LT2.

Further, FIGS. 26B and 26C show values of the weights $w_B$ relating to the respective pixels in FIG. 26A. FIG. 26B shows an example in which a transition line TL1 (broken line) indicating transition of the weight $w_B$ value in the unit pattern region LT1 and a transition line TL2 (single-dotted chain line) indicating transition of the weight $w_B$ value in the unit pattern region LT2 are continuous when crossing a boundary line BL between the unit pattern region LT1 and the unit pattern region LT2 at a value zero. The example shown in FIG. 26B causes an output image of which a boundary between two types of unit pattern regions is not relatively noticeable. Further, FIG. 26C shows an example in which the transition lines TL1 and TL2 are not continuous when crossing the boundary line BL. The example shown in FIG. 26C causes an output image of which a boundary between two types of unit pattern regions are relatively noticeable.

Specifically, FIG. 26B shows that the weight $w_B$ value relating to each of the pixels G1 to G5 included in the unit pattern region LT1 is equal to or less than 0, that is, equal to or less than the weight $w_R$, and the weight $w_B$ value relating to each of the pixels G6 to G10 included in the unit pattern region LT2 is equal to or greater than 0, that is, equal to or greater than the weight $w_R$.

Further, FIG. 26C shows that the weight $w_B$ value relating to each of the pixels G1 to G5 included in the unit pattern region LT1 and the pixels G7 to G9 included in the unit pattern region LT2 is equal to or greater than 0, that is, equal to or greater than the weight $w_R$, and the weight $w_B$ value relating to each of the pixels G2 to G4 included in the unit pattern region LT1 and the pixels G6 and G10 included in the unit pattern region LT2 is equal to or less than 0, that is, equal to or less than the weight $w_R$.

Further, in both of FIGS. 26B and 26C, a trace of the transition line TL1 is in a sign-reversed relationship with a trace of the transition line TL2. Specifically, the trace of the transition line TL1 of the weight $w_B$ when going from the center of the unit pattern region LT1 toward the periphery is in a sign-reversed relationship with the trace of the transition line TL2 of the weight $w_B$ when going from the center of the unit pattern region LT2 toward the periphery. This is similarly applied to the weight $w_R$.

Then, the control unit 1 corrects the derived "weight" value $w_B$ as necessary. In this embodiment, the control unit 1 executes addition correction and multiplication correction. The addition correction is a process of adding an addition correction value to the "weight" value $w_B$. The addition correction value preferably has a size capable of inverting a maximum value and a minimum value of the "weight" value $w_B$. In a case where the "weight" value $w_B$ is −1 or greater and 1 or less, a value which −2 or greater and 2 or less may be acquired as the addition correction value. In this embodiment, as the value of the addition correction value is larger, the "weight" value $w_B$ becomes larger, and the influence of a pixel value in the input image of the rear camera 2B increases. The multiplication correction is a process of multiplying the "weight" value $w_B$ by a multiplication correction value. As the multiplication correction value, a value which is 0 greater and 1 or less may be acquired. In this embodiment, as the value of the multiplication correction value is smaller, the "weight" value $w_B$ becomes closer to zero (middle value), and a pixel value in an output image comes closer to a simple average between the pixel value in the input image of the rear camera 2B and the pixel value in the input image of the right-side camera 2R. Further, when the value of the multiplication correction value is zero, the value $w_B$ is equal to the value $w_R$, and a weighted average value calculated using the value $w_B$ and the value $w_R$ becomes a simple average value.

Figure 27A:
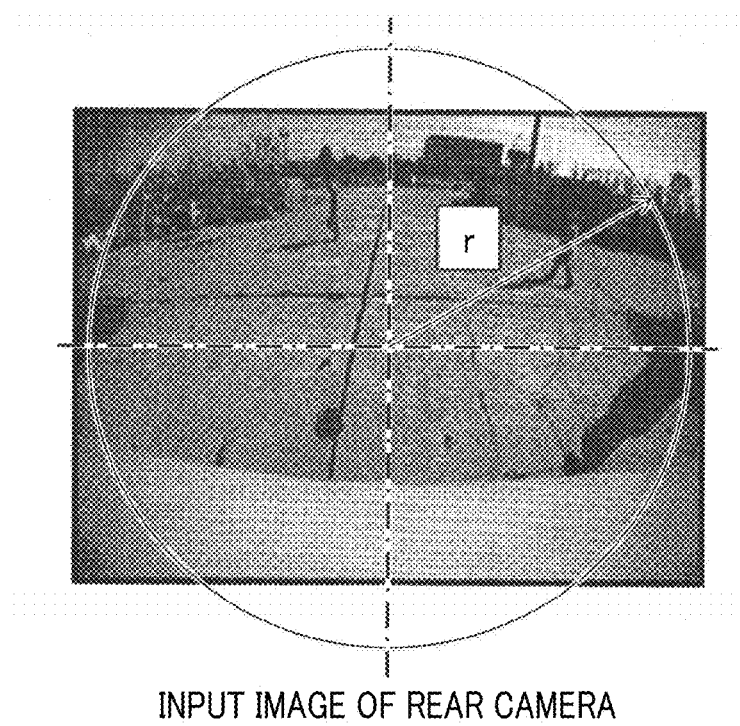
FIG. 27A is a diagram illustrating a limb darkening countermeasure process.
Figure 27B:
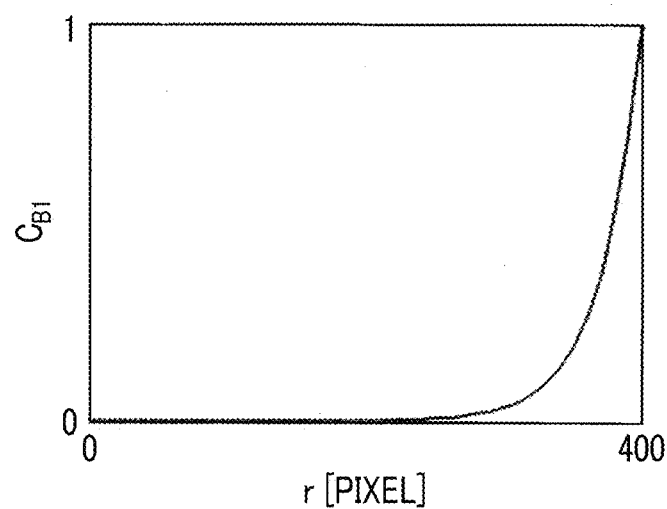
FIG. 27B is a diagram illustrating the limb darkening countermeasure process.

In this embodiment, the control unit 1 executes a limb darkening countermeasure process which is an example of the addition correction. FIGS. 27A and 27B are diagrams illustrating the limb darkening countermeasure process. FIG. 27A shows a circle of a radius r [pixel] around a central point of an input image of the rear camera 2B, and FIG. 27B shows a relationship between the radius r and an addition correction value $C_{B1}$. The limb darkening countermeasure process is a process of reducing darkness of a peripheral portion of an input image due to reduction in the intensity of peripheral light.

Specifically, the control unit 1 derives the addition correction value $C_{B1}$ depending on the position of a pixel in the input image of the rear camera 2B, and adds a value obtained by multiplying a value obtained by rounding off (limited to a minimum value 0 and a maximum value 1) the derived addition correction value $C_{B1}$ into a value which is 0 or greater and 1 or less by −2 to the "weight" value $w_B$ corresponding thereto. The multiplication of the addition correction value $C_{B1}$ by −2 (negative value) is performed for reducing, by reducing the weight value wB of the pixel value in the peripheral portion of the input image of the rear camera 2B, the influence of the pixel value.

The addition correction value $C_{B1}$ is expressed by the following expression. Here, $B_0$ represents a parameter indicating rapid stiffness, and for example, $1 \leq B_0 \leq 52$. Further, $B_1$ represents a value of r when the addition correction value $C_{B1}$ reaches the value 1, and in this embodiment, 400 [pixels].

$$C_{B1} = \frac{1}{\exp\left(\frac{B_1 - r}{B_0}\right)} \quad \text{[Expression 16]}$$

Similarly, the control unit 1 derives an addition correction value $C_{R1}$ (not shown) depending on the position of a pixel in the input image of the right-side camera 2R, and adds a value obtained by multiplying a value obtained by rounding off (limited to a minimum value 0 and a maximum value 1) the derived addition correction value $C_{R1}$ into a value which is 0 or greater and 1 or less by +2 to the "weight" value $w_B$ corresponding thereto. The multiplication of the addition correction value $C_{R1}$ by +2 (positive value) is performed for reducing, by increasing the weight value $w_B$ of the pixel value in the input image of the rear camera 2B to increase the influence of the pixel value, the influence of the pixel value in the peripheral portion of the input image of the right-side camera 2R.

Figure 28A:
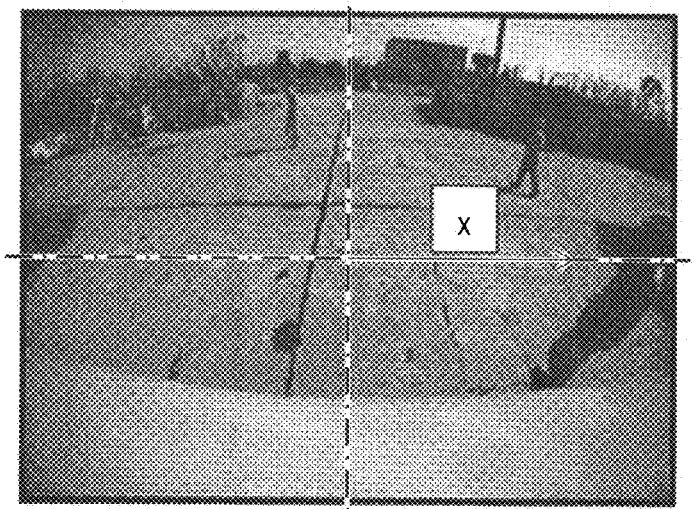
FIG. 28A is a diagram illustrating a side edge countermeasure process.
Figure 28B:
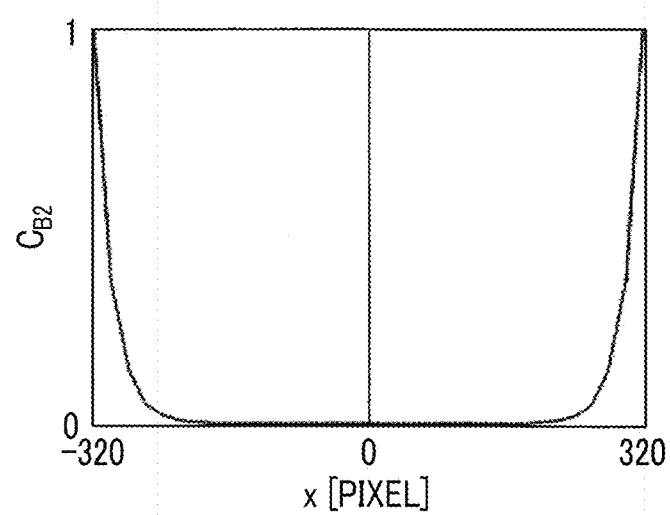
FIG. 28B is a diagram illustrating the side edge countermeasure process.

Further, the control unit 1 executes a side edge countermeasure process which is an example of the addition correction. FIGS. 28A and 28B are diagrams illustrating the side edge countermeasure process, in which FIG. 28A shows an arrow that extends to the right by a horizontal distance x [pixels] from a central point of an input image of the rear camera 2B, and FIG. 28B shows a relationship between the horizontal distance x and the addition correction value $C_{B2}$. The side edge countermeasure process is a process of reducing a rapid change of pixel values when pixels on an output image corresponding to pixels in a side edge portion of one input image are adjacent to pixels on an output image corresponding to pixels of the other input image so as not to be noticeable.

Specifically, the control unit 1 derives the addition correction value $C_{B2}$ depending on the position of a pixel in the input image of the rear camera 2B, and adds a value obtained by multiplying a value obtained by rounding off (limited to a minimum value 0 and a maximum value 1) the derived addition correction value $C_{B2}$ into a value which is 0 or greater and 1 or less by −2 to the "weight" value $w_B$ corresponding thereto. The multiplication of the addition correction value $C_{B2}$ by −2 (negative value) is performed for reducing, by reducing the weight value $w_B$ of the pixel value in the side edge portion of the input image of the rear camera 2B, the influence of the pixel value.

The addition correction value $C_{B2}$ is expressed by the following expression. Here, $B_2$ represents a parameter indicating rapid steepness, and for example, $0 \leq B_2 \leq 1$. Further, $B_3$ represents a value of x when the addition correction value $C_{B2}$ reaches the value 1, and in this embodiment, ±320 [pixels].

$$C_{B2} = \frac{1}{\exp\left(\frac{B_3 - |x|}{B_2}\right)} \quad \text{[Expression 17]}$$

Similarly, the control unit 1 derives an addition correction value $C_{R2}$ (not shown) depending on the position of a pixel in the input image of the right-side camera 2R, and adds a value obtained by multiplying a value obtained by rounding off the derived addition correction value $C_{R2}$ into a value which is 0 or greater and 1 or less by +2 to the "weight" value $w_B$ corresponding thereto. The multiplication of the addition correction value $C_{R2}$ by +2 (positive value) is performed for reducing, by increasing the weight value $w_B$ of the pixel value in the input image of the rear camera 2B to increase the influence of the pixel value, the influence of the pixel value in the side edge portion of the input image of the right-side camera 2R.

Figure 29A:
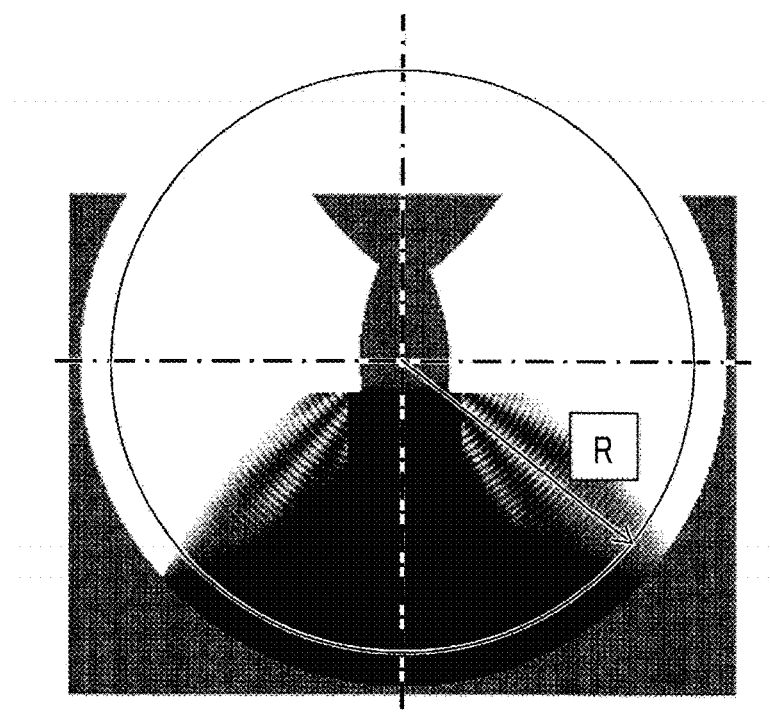
FIG. 29A is a diagram illustrating a distant region patterning countermeasure process.
Figure 29B:
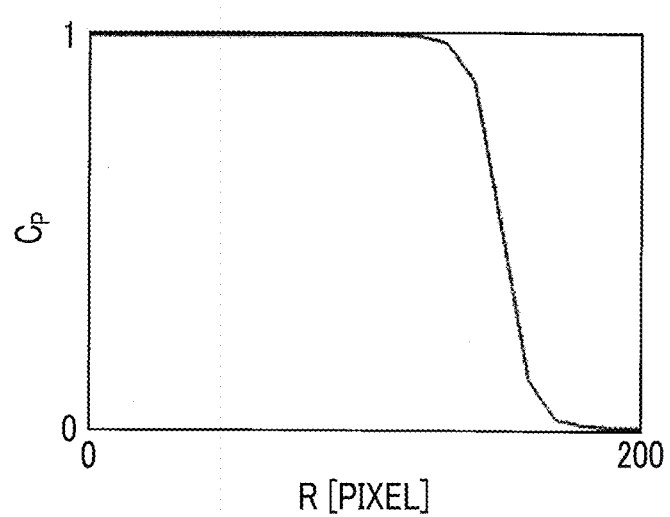
FIG. 29B is a diagram illustrating the distant region patterning countermeasure process.

Further, the control unit 1 executes a distant region patterning countermeasure process which is an example of the multiplication correction. FIGS. 29A and 29B are diagrams illustrating the distant region patterning countermeasure process, in which FIG. 29A shows a circle of radius R [pixels] around a central point of a space model MD, and FIG. 29B shows a relationship between the radius R and a multiplication correction value $C_P$. A white color in FIG. 29A indicates that the "weight" value $w_B$ is −1, a black color in FIG. 29A indicates that the "weight" value $w_B$ is +1, and a middle color in FIG. 29A indicates that the "weight" value $w_B$ is larger than −1 and smaller than +1. The distant region patterning countermeasure process is a process of making a lattice pattern in a distant region of an output image portion corresponding to an overlap region (distant region from the center of the space model MD) be unnoticeable. Specifically, the distant region patterning countermeasure process makes a weighted average value employed as values of pixels in a distant region close to a simple average value. That is, by making a multiplication correction value close to zero, the value $w_B$ comes close to the value $w_R$. Thus, the distant region patterning countermeasure process can enhance an appearance of a three-dimensional object image in a distant region while maintaining visibility of the three-dimensional object image in a region other than the distant region which is an output image portion corresponding to an overlap region. In the distant region, since a characteristic as a looked-down image is weakened, loss of a three-dimensional object is not easily generated compared with a region close to the center. Thus, even though a weighted average value employed as pixel values is close to a simple average value, an operator who visually recognizes an output image can appropriately recognize the presence of a three-dimensional object image.

Specifically, the control unit 1 derives the multiplication correction value $C_P$ depending on the position of a pixel in an output image, and multiplies the "weight" value $w_B$ corresponding thereto by the derived multiplication correction value $C_P$. This is because values of pixels in a distant region is close to a simple average of values of pixels in an input image of the rear camera 2B and values of pixels in an input image of the right-side camera 2R.

The multiplication correction value $C_P$ is expressed by the following expression. Here, $B_4$ represents a parameter indicating rapid steepness, and for example, $0 \leq B_4 \leq 10$. Further, $B_5$ represents a value of R when the multiplication correction value $C_P$ reaches an inflection point, and in this embodiment, 150 [pixels].

$$C_P = 1 - \frac{1}{1 + \exp\left(\frac{B_5 - R}{B_4}\right)} \quad \text{[Expression 18]}$$

In this way, the control unit 1 executes the addition correction and the multiplication correction to correct the "weight" value $w_B$. In this embodiment, the control unit 1 corrects the "weight" value $w_B$ as indicated by the following expression. In the following expression, a value $w'_B$ represents a corrected value.

$$w'_B = (w_B - 2 \times C_{B1} + 2 \times C_{R1} - 2 \times C_{B2} + 2 \times C_{R2}) \times C_P \quad \text{[Expression 19]}$$

The control unit 1 may not perform at least one of the limb darkening countermeasure process, the side edge countermeasure process, and the distant region patterning countermeasure process. For example, the control unit 1 may not perform all of the limb darkening countermeasure process, the side edge countermeasure process, and the distant region patterning countermeasure process, or may not perform the limb darkening countermeasure process or the side edge countermeasure process.

Then, the control unit 1 converts the corrected "weight" value $w'_B$ in a hardware mountable form. In this embodiment, the control unit 1 scale-converts the "weight" value $w'_B$ into a value which is 0 or greater and 255 or less. This is because the converted value is suitable for a binary arithmetic operation.

Further, the control unit 1 derives values $w'_B$ and $w'_R$ so that the sum of the "weight" value $w'_B$ of a pixel value in an input image of the rear camera 2B and a "weight" value $w'_R$ of a pixel value in an input image of the right-side camera 2R becomes 255. Here, the value $w'_R$ represents a value derived from the corrected "weight" value $w'_B$.

For example, if the "weight" value $w'_B$ which is the pixel value in the input image of the rear camera 2B is 255 which is a maximum value, the control unit 1 sets the "weight" value $w'_R$ which is the pixel value in the input image of the right-side camera 2R to 0 which is a minimum value. In this case, the control unit 1 sets a contribution degree of the pixel value in the input image of the right-side camera 2R to zero, and uses the pixel value in the input image of the rear camera 2B as a pixel value of an output image as it is.

On the other hand, if the value $w'_B$ is 0 which is the minimum value, the control unit 1 sets the value $w'_R$ to 255 which is the maximum value. In this case, the control unit 1 sets a contribution degree of the pixel value in the input image of the rear camera 2B to zero, and uses the pixel value in the input image of the right-side camera 2R as the pixel value of the output image as it is.

Further, if the value $w'_B$ is 153, the control unit 1 sets the value $w'_R$ to 102. In this case, the control unit 1 determines the pixel value of the output image so that a ratio between the contribution degree of the pixel value in the input image of the rear camera 2B and the pixel value in the input image of the right-side camera 2R is 3:2.

In this embodiment, weight averaging of the pixel value of the input image of the rear camera 2B and the pixel value of the input image of the right-side camera 2R is executed using the weight averaging unit 112 (see FIG. 11) in the output image generation unit 11 of the control unit 1. The weight averaging unit 112 derives a pixel value in an output image based on the weight $w'_B$ of the pixel value in the input image of the rear camera 2B. For example, a case where the pixel value in the input image of the rear camera 2B has color data (Y3, Cb3, Cr3) of a YCbCre type and the pixel value in the input image of the right-side camera 2R has color data (Y4, Cb4, Cr4) may be considered. Here, Y3 and Y4 represent luminance signals, and for example, have levels of 256 steps (8 bits). Further, Cb3, Cb4, Cr3, and Cr4 represent color difference signals, and for example, have levels of 256 steps (8 bits). In this case, the luminance signal Y is expressed as Y={$w'_B \times$Y3+(255−$w'_B$)×Y4}/256. Further, the color difference signal Cb is expressed as Cb={$w'_B \times$Cb3+(255−$w'_B$)×Cb4}/256, and the color difference Cr is expressed as Cr={$w'_B \times$Cr3+(255−$w'_B$)×Cr4}/256. The reason why the value "255" is used instead of the value "256" is based on the above description. Further, division based on the value "256" is realized by eight-time right shift operations. With this configuration, the image generation device 100 can realize a small amount of computation suitable for embedded mounting based on a field programmable gate array (FPGA) or the like with respect to the weight averaging in the averaging boundary process, similar to the weight averaging in the interpolation process. Thus, the image generation device 100 can have a configuration in which a dividing circuit or the like is not provided even in a case where an averaging boundary process is mounted in addition to an interpolation process.

Figure 30A:
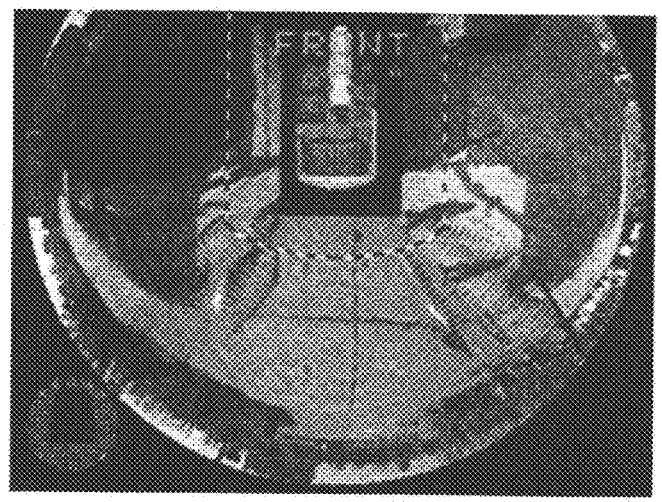
FIG. 30A is a diagram illustrating an effect of the averaging boundary process.
Figure 30B:
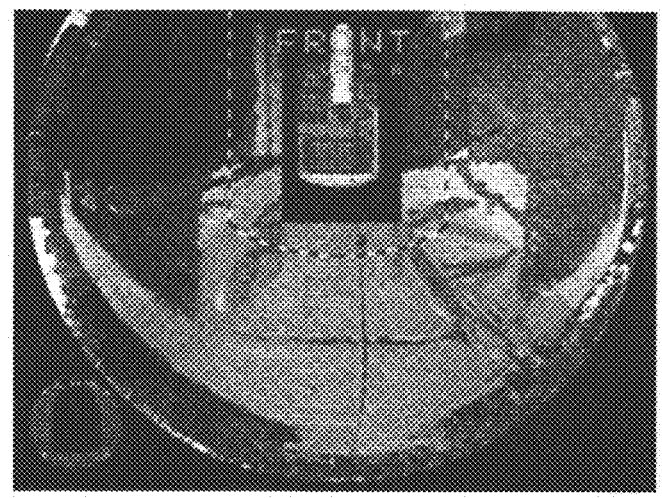
FIG. 30B is a diagram illustrating an effect of the averaging boundary process.
Figure 30C:
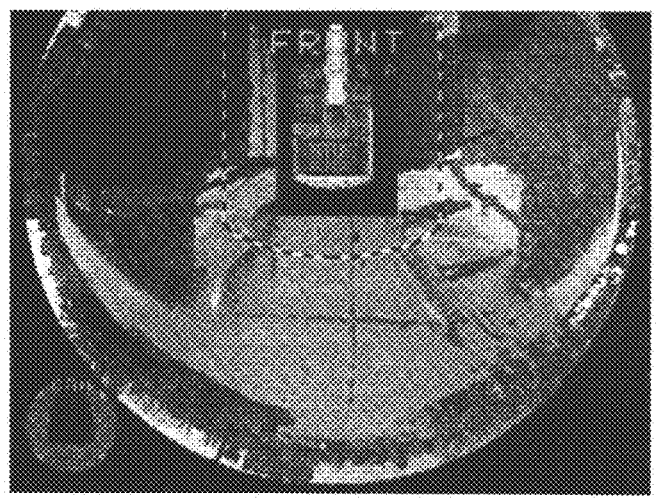
FIG. 30C is a diagram illustrating an effect of the averaging boundary process.

FIGS. 30A to 30C are diagrams illustrating effects of an averaging boundary process. Here, FIG. 30A shows an example of an output image generated by applying a lattice pattern forming process without applying the averaging boundary process. Further, FIG. 30B is an example of an output image generated by applying the averaging boundary process, and shows a state where a pixel value in an input image of the rear camera 2B and pixel values in input images of the side cameras 2L and 2R are weight-averaged in an output image portion corresponding to an overlap region. FIG. 30C is another example of an output image generated by applying the averaging boundary process, and shows a state where a pixel value in an input image of the rear camera 2B and pixel values in input images of the side cameras 2L and 2R are weight-averaged in an output image portion corresponding to an overlap region. The image generation device 100 may generate an output image shown in FIG. 30A by applying the averaging boundary process.

As shown in FIG. 30, visibility of a three-dimensional object image in an output image portion corresponding to an overlap portion is the highest in FIG. 30A, and is lowered in the order of FIGS. 30B and 30C. An operator may most clearly recognize the three-dimensional object image in the output image portion corresponding to the overlap portion in the output image shown in FIG. 30A, and may not easily recognize the three-dimensional object image due to blurring of the three-dimensional object image due to mixing of pixel values based on an weighted average or a simple average in the output images shown in FIGS. 30B and 30C.

On the other hand, an appearance of the output image portion corresponding to the overlap region is most excellent in FIG. 30C, and is lowered in the order of FIGS. 30B and 30A. That is, the operator is not troubled with a lattice pattern in the output image shown in FIG. 30C, but may feel discomfort due to the presence of the lattice pattern in the output images shown in FIGS. 30B and 30A.

Based on the above-mentioned characteristic, the operator of the image generation device 100 can freely adjust balance of the visibility and the appearance in a trade-off relationship according to operating environments of the shovel, weather, ambient brightness, or the like. As a result, the operator can enhance an appearance of an output image as necessary.

Figure 31:
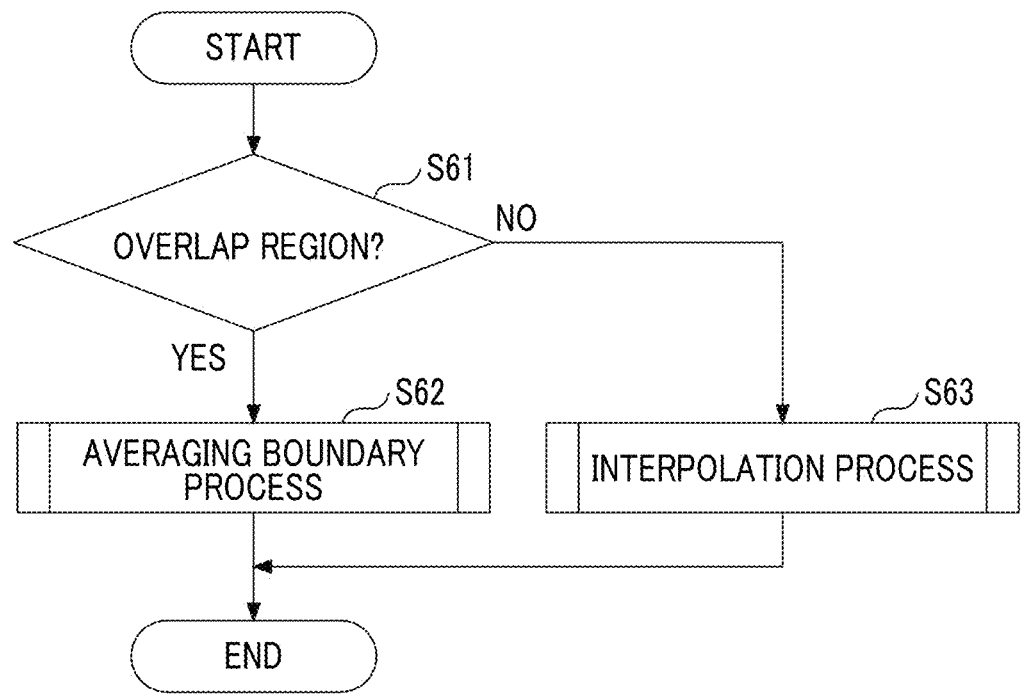
FIG. 31 is a flowchart illustrating a flow of an output image upgrading process.

Next, a flow of a process (hereinafter, referred to as an "output image upgrading process") of causing the output image generation unit 11 to selectively execute the averaging boundary process and the interpolation process according to the position of a pixel in an output image will be described with reference to FIG. 31. FIG. 31 is a flowchart illustrating a flow of the output image upgrading process. Further, the output image generation unit 11 executes the output image upgrading process instead of independently executing the interpolation process of FIG. 12 in step S5 of FIG. 7, for example.

First, the output image generation unit 11 determines whether a pixel of which a pixel value is to be derived belongs to an output image portion corresponding to an overlap portion (step S61).

In a case where it is determined that the pixel belongs to the output image portion corresponding to the overlap portion (YES in step S61), the output image generation unit 11 executes the averaging boundary process (step S62).

On the other hand, it is determined that the pixel does not belong to the output image portion corresponding to the overlap portion (NO in step S61), the output image generation unit 11 executes the interpolation process (step S63).

Both of weight averaging in the averaging boundary process and weight averaging in the interpolation process are executed by the weight averaging unit 112 of the output image generation unit 11. In this embodiment, the weight averaging unit 112 executes the weight averaging using a binary arithmetic operation without particularly distinguishing the two types of weighted averaging. Specifically, the weight averaging unit 112 weight-averages two pixel values in one input image using a weight $\alpha$ in the interpolation process, and weight-averages two pixel values in two input images using a weight w in the averaging boundary process. Thus, the image generation device 100 does not need to independently prepare a functional element for the weight averaging in the averaging boundary process and a functional element for the weight averaging in the interpolation process. This configuration is effective in a case where there is a specific restriction in a resource of the control unit 1, for example, in a case where the output image generation unit 11 is realized by the FPGA.

With such a configuration, the image generation device 100 determines a weight of a pixel value in an input image of one camera and a weight of a pixel value in an input image of the other camera to be adjustable using a value of a "field" set on an output image plane. Here, the value of the "field" represents a physical quantity relating to amplitude of a composite wave of a wave when one camera among two cameras of which imaging ranges partially overlap each other is a wave source and a wave when the other camera is a wave source. Further, by weight-averaging a pixel value in an input image of one camera and a pixel value of an input image of the other camera, a value of a pixel in an output image portion corresponding to the overlap region is derived. Thus, it is possible to freely adjust balance of visibility and an appearance of an output image in a trade-off relationship.

Further, the control unit 1 converts the value of the "field" which is the physical quantity relating to the amplitude of the composite wave of the above-mentioned two waves into a value of a "weight" of the pixel value in the input image of one camera. Further, the control unit 1 derives a value of a "weight" of the pixel value in the input image of the other camera from the value of the "weight" of the pixel value in the input image of one camera. Further, the control unit 1 converts both of the value of the "weight" of the pixel value in the input image of one camera and the value of the "weight" of the pixel value in the input image of the other camera into values in a predetermined range (for example, 0 or greater and 255 or less). Further, the sum of the value of the "weight" of the pixel value in the input image of one camera and the value of the "weight" of the pixel value in the input image of the other camera is maintained as a constant value (for example, 255). Thus, the image generation device 100 can realize a small amount of computation suitable for mounting of the FPGA or the like with respect to the weight averaging in the averaging boundary process.

Further, the control unit 1 converts the value of the "field" into the value of the "weight" of the pixel value in the input image of one camera using a predetermined conversion curve. Thus, the image generation device 100 can uniquely determine the values of the "weights" of the pixel values in the respective input images of two cameras based on a positional relationship of two cameras with respect to each pixel in an output image portion of the overlap region.

Further, the control unit 1 corrects weights of values of pixels in peripheral portions of two input images into lower values. Thus, the image generation device 100 can reduce the darkness of a peripheral portion of an input image due to reduction in the intensity of peripheral light so as not to be noticeable, in an output image portion corresponding to an overlap portion.

Further, the control unit 1 corrects weights of values of pixels in side edge portions of two input images into lower values. Thus, the image generation device 100 can reduce a rapid change of pixel values when pixels on an output image corresponding to pixels in a side edge portion of one input image are adjacent to pixels on an output image corresponding to pixels of the other input image so as not to be noticeable in the output image portion corresponding to the overlap region.

Further, the control unit 1 corrects the weights of the pixel values of two input signals so that the weight of the pixel value of the input image of one camera is close to the weight of the pixel value of the input image of the other camera, with respect to pixels in a distant region of the output image portion corresponding to the overlap portion. Thus, the image generation device 100 can make a lattice pattern in the distant region be unnoticeable.

Hereinbefore, the preferred embodiments of the invention have been described, but the invention is not limited to the above-described embodiments, and various modifications and replacements may be made with respect to the above-described embodiments without departing from the scope of the invention.

For example, in the above-described embodiments, the image generation device 100 may derive various values such as the value f of the "field", the value w of the "weight", the addition correction values CB1, CR1, CB2, and CR2, the multiplication correction value CP, or the corrected value w' of the "weight" using an operational expression, or using a predetermined reference table.

Further, in a case where the value w of the "weight", the addition correction values CB1, CR1, CB2, and CR2, the multiplication correction value CP, and the like are converted into values in a predetermined range, the image generation device 100 may use scale conversion or the like, instead of rounding off. Furthermore, the image generation device 100 may independently perform a conversion process in an individual operation, or may perform a conversion process after some continuous operations.

Further, the image generation device 100 employs a cylindrical space model MD as a space model, but may employ a space model of a pillar shape such as a prism, may employ a space model formed by two surfaces of a bottom surface and a side surface, or may employ a space model only including a side surface.

In addition, the image generation device 100 is mounted on a self-propelled construction machine including a movable member such as a bucket, an arm, a boom, or a turning mechanism, together with a camera. Further, the image generation device 100 is assembled in an operation support system that supports movement of the construction machine and an operation of the movable member while presenting peripheral images to an operator. However, the image generation device 100 may be mounted on an operation target body that includes a movable member but is not self-propelled, such as an industrial machine or a fixed crane, together with a camera, and may be assembled in an operation support system that supports an operation of the operation target body.

It should be understood that the invention is not limited to the above-described embodiment, but may be modified into various forms on the basis of the spirit of the invention. Additionally, the modifications are included in the scope of the invention.

What is claimed is:

1. An image generation device that generates an output image based on a plurality of input images captured by a plurality of cameras attached to an operation target body, wherein respective input image portions of two of the plurality of cameras corresponding to an overlap region of respective imaging ranges of two of the plurality of cameras are disposed to form a lattice pattern in the output image, the lattice pattern uses, as a unit pattern, lattice points divided by a circle indicating a mountain of a first wave when the position of a first camera is a wave source, a circle indicating a valley of the first wave, a circle indicating a mountain of a second wave when the position of a second camera is a wave source, and a circle indicating a valley of the second wave, values of pixels that form the unit pattern are values obtained by weight-averaging values of pixels of a first input image captured by the first camera and values of pixels of a second input image captured by the second camera, in one of a unit pattern through which an abdominal line formed by the first wave and the second wave passes and a unit pattern through which a nodal line formed by the first wave and the second wave passes, a weighted average value of the values of the pixels of the first input image relating to respective pixels is equal to or larger than a weighted average value of the values of the pixels of the second input image relating to the respective pixels, and in the other one thereof, a weighted average value of the values of the pixels of the first input image relating to respective pixels is equal to or smaller than a weighted average value of the values of the pixels of the second input image relating to the respective pixels, and a weight of a value of each pixel of the first input image and a weight of a value of each pixel of the second input image are determined according to a physical quantity relating to an amplitude of a composite wave of the first wave and the second wave.

2. The image generation device according to claim 1, wherein a trace of a transition line of the weight of the value of the pixel of the first input image or the weight of the value of the pixel of the second input image when going from the center of the unit pattern through which the abdominal line passes toward the periphery thereof is in a sign-reversed relationship with a trace of a transition line of the weight of the value of the pixel of the first input image or the weight of the value of the pixel of the second input image when going from the center of the unit pattern through which the nodal line passes toward the periphery thereof.

3. The image generation device according to claim 1, comprising:

a control unit that converts the physical quantity relating to the amplitude of the composite wave of the first wave and the second wave, determined according to the position of the pixel in the output image, into the weight of the value of the pixel of the first input image, wherein both of the weight of the value of the pixel of the first input image and the weight of the value of the pixel of the second input image are converted into a respective value in a predetermined range, and a sum of the weight of the value of the pixel of the first input image and the weight of the value of the pixel of the second input image is constant.

4. The image generation device according to claim 3, wherein the control unit converts the physical quantity into the weight of the value of the pixel of the first input image using a predetermined conversion curve.

5. The image generation device according to claim 3, wherein the control unit corrects a weight of a value of a pixel in a peripheral portion of each of the first input image and the second input image into a smaller value.

6. The image generation device according to claim 3, wherein the control unit corrects a weight of a value of a pixel in a side edge portion of each of the first input image and the second input image into a smaller value.

7. The image generation device according to claim 3, wherein the control unit corrects the weight of the value of the pixel of each of the first input image and the second input image so that the weight of the value of the pixel of the first input image is close to the weight of the value of the pixel of the second input image, with respect to a pixel in a distant region of an output image portion corresponding to the overlap region of the respective imaging ranges of two of the plurality of cameras.

8. An operation support system that supports a movement or an operation of an operation target body, comprising:

the image generation device according to claim 1; and a display unit that is provided in an operation room for moving or operating the operation target body and displays an output image generated by the image generation device.

9. An image generation device that generates an output image based on a plurality of input images captured by a plurality of cameras attached to an operation target body, wherein the output image includes an output image portion that corresponds to an overlap region of respective imaging ranges of two cameras of the plurality of cameras, the output image portion having a lattice pattern with a plurality of unit pattern regions, a pixel value in a respective unit pattern region of the plurality of unit pattern regions is determined by averaging pixel values of two corresponding input pixels in respective input images captured by the two cameras, and the degree of the averaging is different according to a position of the pixel in the respective unit pattern region, the plurality of cameras includes a first camera and a second camera, the plurality of unit pattern regions includes a first unit pattern region where a first weight value, which is a weight value of a pixel value in a first input image that the first camera has captured, is equal to or greater than a second weight value, which is a weight value of a pixel value in a second input image that the second camera has captured, and a second unit pattern region where the first weight value is equal to or less than the second weight value, the lattice pattern is formed by alternately disposing the first unit pattern region and the second unit pattern region with each other, the first weight value and the second weight value are determined according to a physical quantity relating to an amplitude of a composite wave of a first wave having a position of the first camera as a wave source and a second wave having a position of the second camera as a wave source, and the physical quantity is calculated based on the position of the first camera, the position of the second camera, a wavelength and a phase of the first wave, and a wavelength and a phase of the second wave.

10. The image generation device according to claim 9, wherein in the pixel value in the first unit pattern region, as a pixel is closer to a central portion of the first unit pattern region, a contribution degree of the pixel value in the first input image is higher than a contribution degree of the pixel value in the second input image, and in the pixel value in the second unit pattern region, as a pixel is closer to a central portion of the second unit pattern region, the contribution degree of the pixel value in the second input image is higher than the contribution degree of the pixel value in the first input image.

11. The image generation device according to claim 10, wherein a first transition line representing a transition of the first weight value in the first unit pattern region is convex so that a contribution degree of the pixel value in the first input image becomes maximum at the central portion of the first unit pattern region, a second transition line representing the transition of the first weight value in the second unit pattern region is convex so that a contribution degree of the pixel value in the second input image becomes maximum at the central portion of the second unit pattern region, and the convex direction of the first transition line and the convex direction of the second transition line are opposite to each other.

12. The image generation device according to claim 10, wherein a weight value of a pixel value of at least one of a peripheral portion and a side edge portion of each of the first input image and the second input image is corrected into a smaller value than the weight value of the pixel value of the central portion.

13. The image generation device according to claim 9, wherein a sum of the first weight value and the second weight value is constant with regard to the pixel value of each pixel in the unit pattern region, and as one of the first weight value and the second weight value increases, the other decreases.

* * * * *